United States Patent
Kim et al.

(10) Patent No.: US 9,565,663 B2
(45) Date of Patent: *Feb. 7, 2017

(54) METHOD AND APPARATUS FOR TRANSMITTING UPLINK CONTROL INFORMATION IN A WIRELESS COMMUNICATION SYSTEM

(71) Applicant: LG ELECTRONICS INC., Seoul (KR)

(72) Inventors: Min Gyu Kim, Anyang-si (KR); Suck Chel Yang, Anyang-si (KR); Joon Kui Ahn, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,175

(22) Filed: Mar. 24, 2015

(65) Prior Publication Data

US 2015/0230238 A1    Aug. 13, 2015

Related U.S. Application Data

(60) Continuation of application No. 14/024,143, filed on Sep. 11, 2013, now Pat. No. 9,019,947, which is a (Continued)

(51) Int. Cl.
*H04L 1/00* (2006.01)
*H04W 72/04* (2009.01)
(Continued)

(52) U.S. Cl.
CPC .......... *H04W 72/0413* (2013.01); *H04J 13/16* (2013.01); *H04L 1/0073* (2013.01);
(Continued)

(58) Field of Classification Search
CPC ..... H04W 84/18; H04W 84/19; H04B 7/2621; H04L 5/0091; H04J 13/16
(Continued)

(56) References Cited

U.S. PATENT DOCUMENTS 7,952,991 B2    5/2011   Kim et al.
2003/0011854 A1   1/2003   Kahn et al.
(Continued)

FOREIGN PATENT DOCUMENTS

CN    101606338 A    12/2009
JP    2006-166438 A   6/2006
(Continued)

*Primary Examiner* — Dady Chery
(74) *Attorney, Agent, or Firm* — Birch, Stewart, Kolasch & Birch, LLP

(57) ABSTRACT

A method and apparatus for transmitting control information are discussed. The method can include generating uplink control information (UCI) and transmitting the UCI through an physical uplink control channel (PUCCH) in a subframe, wherein when the subframe is configured for transmission of a scheduling request (SR) and when transmission of a hybrid automatic repeat request (HARQ)-acknowledgement (ACK) coincides with the subframe, transmission power of the PUCCH is determined based on a number of HARQ-ACK information bits and a SR bit. A value of the SR bit can be determined by whether or not the subframe is configured for a scheduling request.

12 Claims, 22 Drawing Sheets

Related U.S. Application Data division of application No. 13/395,833, filed as application No. PCT/KR2011/001633 on Mar. 9, 2011, now Pat. No. 8,553,671.

(60) Provisional application No. 61/312,647, filed on Mar. 10, 2010, provisional application No. 61/328,629, filed on Apr. 27, 2010, provisional application No. 61/350,894, filed on Jun. 2, 2010, provisional application No. 61/353,651, filed on Jun. 10, 2010, provisional application No. 61/374,275, filed on Aug. 17, 2010, provisional application No. 61/427,456, filed on Dec. 27, 2010.

(51) Int. Cl.

| | | |
|---|---|---|
| *H04J 13/16* | (2011.01) | |
| *H04L 1/16* | (2006.01) | |
| *H04L 1/18* | (2006.01) | |
| *H04L 1/08* | (2006.01) | |
| *H04L 5/00* | (2006.01) | |
| *H04L 27/26* | (2006.01) | |

(52) U.S. Cl.
CPC .......... *H04L 1/1671* (2013.01); *H04L 1/1692* (2013.01); *H04L 1/1812* (2013.01); *H04L 1/1861* (2013.01); *H04L 5/0055* (2013.01); *H04L 5/0091* (2013.01); *H04W 72/0473* (2013.01); *H04L 1/0026* (2013.01); *H04L 1/08* (2013.01); *H04L 5/0007* (2013.01); *H04L 27/2626* (2013.01)

(58) Field of Classification Search
USPC ....... 370/203, 204, 206, 207, 208, 210, 252, 370/344, 347, 348, 500, 509, 522, 525, 370/528; 455/67.11, 67.13, 68, 69, 70, 455/422.1, 423, 434, 436, 450, 452.2, 455/502, 509, 513, 515, 522
See application file for complete search history.

(56) References Cited

U.S. PATENT DOCUMENTS

| | | |
|---|---|---|
| 2004/0258134 A1 | 12/2004 | Cho et al. |
| 2006/0156184 A1 | 7/2006 | Kim et al. |
| 2008/0134002 A1 | 6/2008 | Yang et al. |
| 2008/0159251 A1 | 7/2008 | Shiokawa |
| 2008/0212464 A1 | 9/2008 | Kim et al. |
| 2009/0042558 A1 | 2/2009 | Shen et al. |
| 2011/0205981 A1* | 8/2011 | Koo .................... H04L 1/1671 370/329 |
| 2012/0236773 A1 | 9/2012 | Shen et al. |
| 2014/0185561 A1 | 7/2014 | Nakao et al. |

FOREIGN PATENT DOCUMENTS

| | | |
|---|---|---|
| JP | 2008-166880 A | 7/2008 |
| KR | 10-2006-0087244 A | 8/2006 |
| RU | 2290764 C2 | 12/2006 |
| WO | WO 2004/023730 A2 | 3/2004 |
| WO | WO 2009/044537 A1 | 4/2009 |

* cited by examiner

METHOD AND APPARATUS FOR TRANSMITTING UPLINK CONTROL INFORMATION IN A WIRELESS COMMUNICATION SYSTEM

CROSS-REFERENCE TO RELATED APPLICATIONS

This application is a Continuation of U.S. patent application Ser. No. 14/024,143 filed on Sep. 11, 2013, which is a Divisional of U.S. patent application Ser. No. 13/395,833 filed on Aug. 10, 2012 (now U.S. Pat. No. 8,553,671), which is the National Phase of PCT International Application No. PCT/KR2011/001633 filed on Mar. 9, 2011, which claims priority under 35 U.S.C. 119(e) to U.S. Provisional Application Nos. 61/312,647 filed on Mar. 10, 2010, 61/328,629 filed on Apr. 27, 2010, 61/350,894 filed on Jun. 2, 2010, 61/353,651 filed on Jun. 10, 2010, 61/374,275 filed on Aug. 17, 2010 and 61/427,456 filed on Dec. 27, 2010. The contents of all of these applications are hereby incorporated by reference as fully set forth herein in their entirety.

BACKGROUND OF THE INVENTION

Field of the Invention

The present invention relates to wireless communications, and more particularly, to a method and apparatus for transmitting uplink control information in a wireless communication system.

Discussion of the Related Art

In order to maximize efficiency of limited radio resources, an effective transmission and reception scheme and various methods of utilization thereof have been proposed in a broadband wireless communication system. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading. As a result, complexity is decreased in a receiving end and an interval of a transmitted symbol is increased, thereby minimizing the ISI.

In a system using the OFDM as a modulation scheme, orthogonal frequency division multiple access (OFDMA) is a multiple access scheme in which multiple access is achieved by independently providing a part of available subcarrier to each user. In the OFDMA, frequency resources (i.e., subcarriers) are provided to respective users, and the respective frequency resources do not overlap with one another in general since they are independently provided to the multiple users. Consequently, the frequency resources are allocated to the respective users in a mutually exclusive manner. In an OFDMA system, frequency diversity for the multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

A multiple input multiple output (MIMO) technique uses multiple transmit antennas and multiple receive antennas to improve data transmission/reception efficiency. Exemplary methods for implementing diversity in a MIMO system include space frequency block code (SFBC), space time block code (STBC), cyclic delay diversity (CDD), frequency switched transmit diversity (FSTD), time switched transmit diversity (TSTD), precoding vector switching (PVS), spatial multiplexing (SM), etc. A MIMO channel matrix depending on the number of receive antennas and the number of transmit antennas can be decomposed into a plurality of independent channels. Each independent channel is referred to as a layer or a stream. The number of layers is referred to as a rank.

Uplink control information (UCI) can be transmitted through a physical uplink control channel (PUCCH). The UCI can include various types of information such as a scheduling request (SR), an acknowledgement/non-acknowledgement (ACK/NACK) signal for hybrid automatic repeat request (HARM), a channel quality indicator (CQI), a precoding matrix indicator (PMI), a rank indicator (RI), etc. The PUCCH carries various types of control information according to a format.

A carrier aggregation system has recently drawn attention. The carrier aggregation system implies a system that configures a broadband by aggregating one or more carriers having a bandwidth smaller than that of a target broadband when the wireless communication system intends to support the broadband.

There is a need for a method for effectively transmitting various types of UCI in the carrier aggregation system.

SUMMARY OF INVENTION

The present invention proposes a method and apparatus for transmitting uplink control information in a wireless communication system.

According to an aspect of the present invention, a method for transmitting uplink control information (UCI), performed by a user equipment, in a wireless communication system, is provided. The method comprising: generating encoded information bits by performing channel coding on information bits of the UCI; generating a modulation symbol sequence by modulating the encoded information bits; generating a spread sequence by block-wise spreading on the modulation symbol sequences with an orthogonal sequence; and transmitting the spread sequence to a base station through an uplink control channel, wherein the information bits of the UCI comprises a first UCI bit sequence and a second UCI information bit.

The spread sequence includes a sequence generated by multiplying some modulation symbols of the modulation symbol sequence by an element of the orthogonal sequence.

The number of some modulation symbols may be equal to the number of subcarriers included in a resource block.

The transmission power of the uplink control channel may be determined based on the number of bits of the first UCI bit sequence and the second UCI information bit.

The first UCI bit sequence may be an acknowledgement/non-acknowledgement (ACK/NACK) bit-stream concatenated with an acknowledgement/non-acknowledgement (ACK/NACK) information bits for each of serving cells, and the second UCI information bit may be a scheduling request (SR) information bit.

The SR information bit may be appended to the end of the ACK/NACK bit-stream.

The SR information bit may be one bit.

The spread sequence can be transmitted to the base station through 1st, 3rd, 4th, 5th, and 7th single carrier-frequency division multiple access (SC-FDMA) symbols in a slot consisting of 7 SC-FDMA symbols.

A reference signal may be transmitted in 2nd and 6th SC-FDMA symbols in the slot.

The spread sequence may be transmitted via a primary cell in which the user equipment performs an initial connection establishment procedure or a connection re-establishment procedure with respect to the base station.

The modulation symbol sequence may be generated by performing quadrature phase shift keying (QPSK) on the encoded information bits.

According to another aspect of the present invention, an apparatus for transmitting uplink control information is provided. The apparatus comprising: a radio frequency (RF) unit for transmitting or receiving a radio signal; and a processor coupled to the RF unit, wherein the processor is configured for: generating encoded information bits by performing channel coding on information bits of the UCI; generating a modulation symbol sequence by modulating the encoded information bits; generating a spread sequence by block-wise spreading on the modulation symbol sequences with an orthogonal sequence; and transmitting the spread sequence to a base station through an uplink control channel, wherein the information bits of the UCI comprises a first UCI bit sequence and a second UCI information bit.

The first UCI bit sequence may be an acknowledgement/non-acknowledgement (ACK/NACK) bit-stream concatenated with an acknowledgement/non-acknowledgement (ACK/NACK) information bits for each of serving cells, and the second UCI information bit may be a scheduling request (SR) information bit.

The SR information bit may be one bit, and can be appended to the end of the ACK/NACK bit-stream.

The transmission power of the uplink control channel may be determined based on the number of bits of the first UCI bit sequence and the second UCI information bit.

According to the present invention, various types of uplink control information (UCI) can be effectively transmitted without collision when the UCI needs to be transmitted in the same subframe or the same slot.

DETAILED DESCRIPTION OF THE INVENTION

The following technologies can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single-Carrier Frequency Division Multiple Access (SC-FDMA). The CDMA system can be implemented using radio technology, such as Universal Terrestrial Radio Access (UTRA) or CDMA2000. The TDMA system can be implemented using radio technology, such as Global System for Mobile communications (GSM), General Packet Radio Service (GPRS), or Enhanced Data Rates for GSM Evolution (EDGE). The OFDMA system can be implemented using radio technology, such as IEEE (Institute of Electrical and Electronics Engineers) 802.11 (Wi-Fi), IEEE 802.16 (Wi-MAX), IEEE 802-20, or Evolved UTRA (E-UTRA). IEEE 802.16m is the evolution of IEEE 802.16e, and it provides backward compatibility with an IEEE 802.16e-based system. UTRA is part of a Universal Mobile Telecommunications System (UMTS). $3^{rd}$ Generation Partnership Project (3GPP) Long Term Evolution (LTE) is part of Evolved UTMS (E-UMTS) using Evolved-UMTS Terrestrial Radio Access (E-UTRA). The 3GPP LTE adopts OFDMA in the downlink and SC-FDMA in the uplink. LTE-A (Advanced) is the evolution of 3GPP LET.

In order to clarify a description, LTE-A is chiefly described, but the technical feature of the present invention is not limited thereto.

Figure 1:
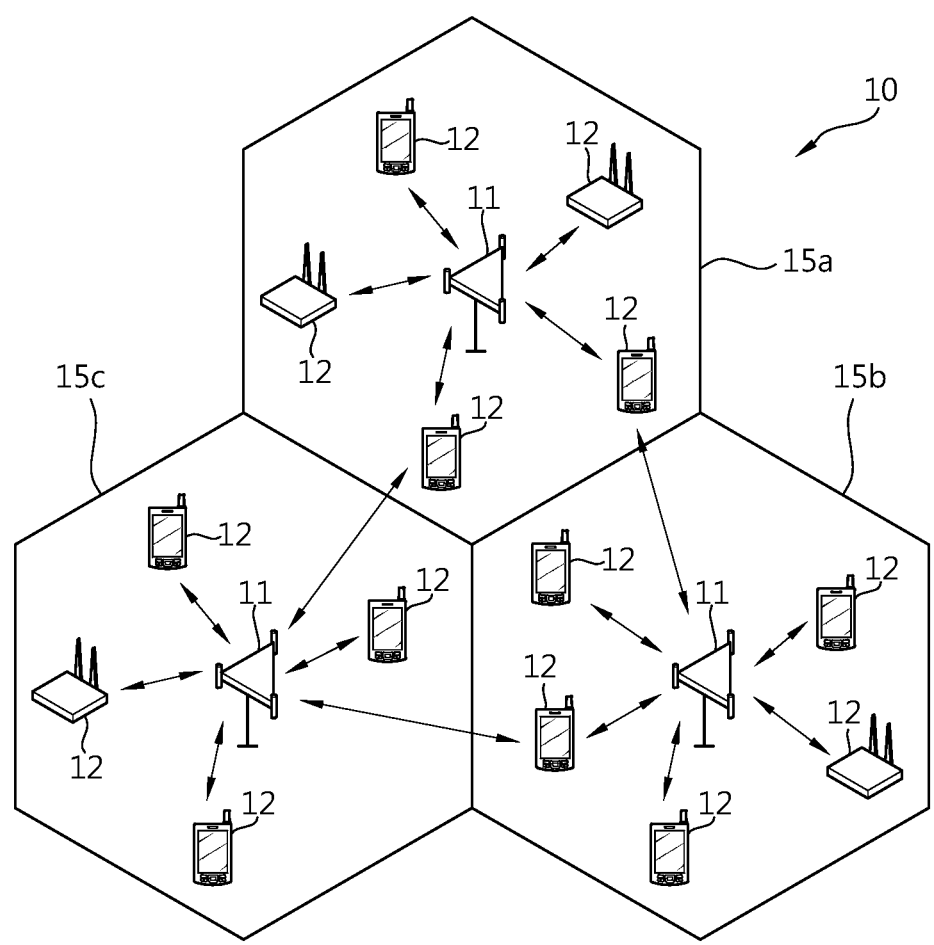
FIG. 1 is a diagram showing a wireless communication system.

FIG. 1 is a diagram showing a wireless communication system.

The wireless communication system 10 includes at least one Base Station (BS) 11. The base stations 11 provide communication services to respective geographical areas (in general, called 'cells') 15a, 15b, and 15c. The cell can be divided into a plurality of areas (called 'sectors'). A User Equipment (UE) 12 can be fixed and mobile and also referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. The base station 11 commonly refers to a fixed station which communicates with the user equipment 12, and it can also be referred to as another terminology, such as an evolved-NodeB (eNB), a Base Transceiver System (BTS), or an access point.

Usually, a UE may be included in one cell. The cell in which the UE is included is called a serving cell. The BS which provides communication services to the serving cell is called a serving BS. The serving BS can provide one or more than one serving cell.

This technology can be applied to downlink or uplink. In general, downlink refers to communication from the base station 11 to the user equipment 12, and uplink refers to communication from the user equipment 12 to the base station 11. A transmitter may be a part of a base station 11 and a receiver may be a part of a user equipment 12 in downlink. A transmitter may be a part of a user equipment 12 and a receiver may be a part of a base station 11 in uplink.

Layers of a radio interface protocol between the UE 12 and the BS 11 can be classified into a first layer (L1), a second layer (L2), and a third layer (L3) based on the lower three layers of the open system interconnection (OSI) model that is well-known in the communication system.

A physical layer, i.e., the first layer, is connected to a medium access control (MAC) layer, i.e., a higher layer, through a transport channel. Data between the MAC and physical layers is transferred through the transport channel. Further, between different physical layers, i.e., between a physical layer of a transmitting side and a physical layer of a receiving side, data is transferred through a physical channel.

A radio data link layer, i.e., the second layer, consists of a MAC layer, an RLC layer, and a PDCP layer. The MAC layer is a layer that manages mapping between a logical channel and the transport channel. The MAC layer selects a proper transport channel to transmit data delivered from the RLC layer, and adds essential control information to a header of a MAC protocol data unit (PDU).

The RLC layer is located above the MAC layer and supports reliable data transmission. In addition, the RLC layer segments and concatenates RLC service data units (SDUs) delivered from an upper layer to configure data having a suitable size for a radio section. The RLC layer of a receiver supports a reassemble function of data to restore an original RLC SDU from the received RLC PDUs.

The PDCP layer is used only in a packet exchange area, and can perform transmission by compressing a header of an IP packet to increase transmission efficiency of packet data in a radio channel.

The RRC layer, i.e., the third layer, exchanges radio resource control information between the UE and the network in addition to controlling of a lower layer. According to a communication state of the UE, various RRC states (e.g., an idle mode, an RRC connected mode, etc.) are defined, and transition between the RRC states is optionally possible. In the RRC layer, various procedures related to radio resource management are defined such as system information broadcasting, an RRC access management procedure, a multiple component carrier setup procedure, a radio bearer control procedure, a security procedure, a measurement procedure, a mobility management procedure (handover), etc.

The wireless communication system may be any one of a multiple-input multiple-output (MIMO) system, a multiple-input single-output (MISO) system, a single-input single-output (SISO) system, or a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and a plurality of receive antennas. Hereinafter, the transmit antenna denotes a physical or logical antenna used for transmission of one signal or stream. The receive antenna denotes a physical or logical antenna used for reception of one signal or stream.

Figure 2:
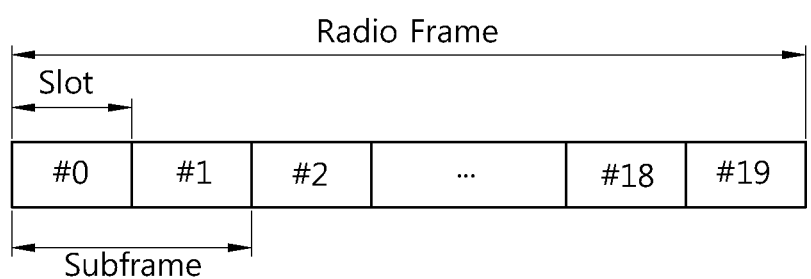
FIG. 2 shows a radio frame structure in 3GPP LTE.

FIG. 2 shows a radio frame structure in 3GPP LTE.

The section 5 of 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)" can be incorporated herein by reference. Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. Since the 3GPP LTE uses OFDMA in downlink (DL) transmission, the OFDM symbol is for representing one symbol period, and can be referred to as other terms. For example, the OFDM symbol can also be referred to as an SC-FDMA symbol when SC-FDMA is used as an uplink (UL) multiple-access scheme. A resource block (RB) is a resource allocation unit, and includes a plurality of consecutive subcarriers in one slot. The above radio frame is shown for exemplary purposes only. Thus, the number of subframes included in the radio frame or the number of slots included in the subframe or the number of OFDM symbols included in the slot may change variously.

In 3GPP LTE, it is defined such that one slot includes 7 OFDM symbols in a normal cyclic prefix (CP) and one slot includes 6 OFDM symbols in an extended CP.

A wireless communication system can be briefly classified into a system based on a frequency division duplex (FDD) scheme and a system based on a time division duplex (TDD) scheme. In the FDD scheme, uplink transmission and downlink transmission are achieved while occupying different frequency bands. In the TDD scheme, uplink transmission and downlink transmission are achieved at different times while occupying the same frequency band. A channel response based on the TDD scheme is reciprocal in practice. This implies that a downlink channel response is almost identical to an uplink channel response in a given frequency domain. Therefore, in a TDD-based wireless communication system, the downlink channel response can be advantageously obtained from the uplink channel response. In the TDD scheme, a full frequency band is time-divided into UL transmission and DL transmission, and thus DL transmission performed by a BS and UL transmission performed by a UE can be simultaneously achieved. In a TDD system in which UL transmission and DL transmission are divided on a subframe basis, UL transmission and DL transmission are performed in different subframes.

Figure 3:
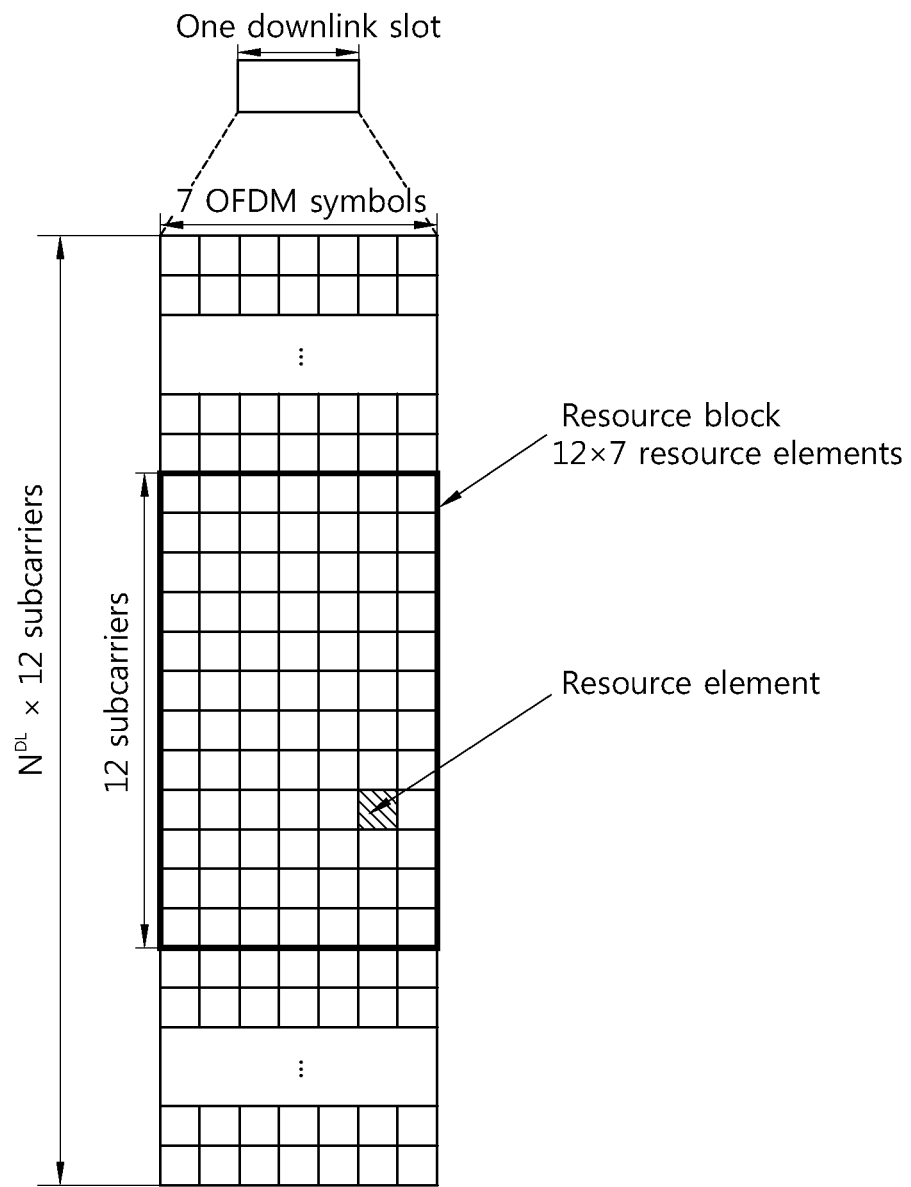
FIG. 3 shows an example of a resource grid for one DL slot.

FIG. 3 shows an example of a resource grid for one DL slot.

The DL slot includes a plurality of OFDM symbols in the time domain and an $N_{RB}$ number of Resource Blocks (RBs) in the frequency domain. The number of resource blocks $N_{RB}$ included in a downlink slot depends on a downlink transmission bandwidth set in a cell. For example, in an LTE system, the number of resource blocks $N_{RB}$ can be any one of 60 to 110. One RB includes a plurality of subcarriers in frequency domain. The structure of a UL slot may be same as that of a DL slot.

Each element on the resource grid is referred to as a resource element (hereinafter referred to as 'RE'). The RE on the resource grid can be identified by an index pair (k,l) within a slot. Here, k (where k=0, . . . , $N_{RB} \times 12-1$) is a subcarrier index within the frequency domain, and l (where l=0, . . . , 6) is an OFDM symbol index within the time domain.

Here, It is illustrated that one resource block includes 7 OFDM symbols in the time domain and 12 subcarrier in the frequency domain, resulting in 7×12 REs. However, the number of OFDM symbols and the number of subcarriers within a resource block are not limited thereto. The number of OFDM symbols and the number of subcarriers can be changed in various ways according to the length of a Cyclic Prefix (CP), frequency spacing, etc. For example, in case of a normal CP, one subframe includes 7 OFDM symbols, and in case of an extended CP, one subframe includes 6 OFDM symbols. One OFDM symbol may use 128, 256, 512, 1024, 1536 or 2048 subcarriers.

Figure 4:
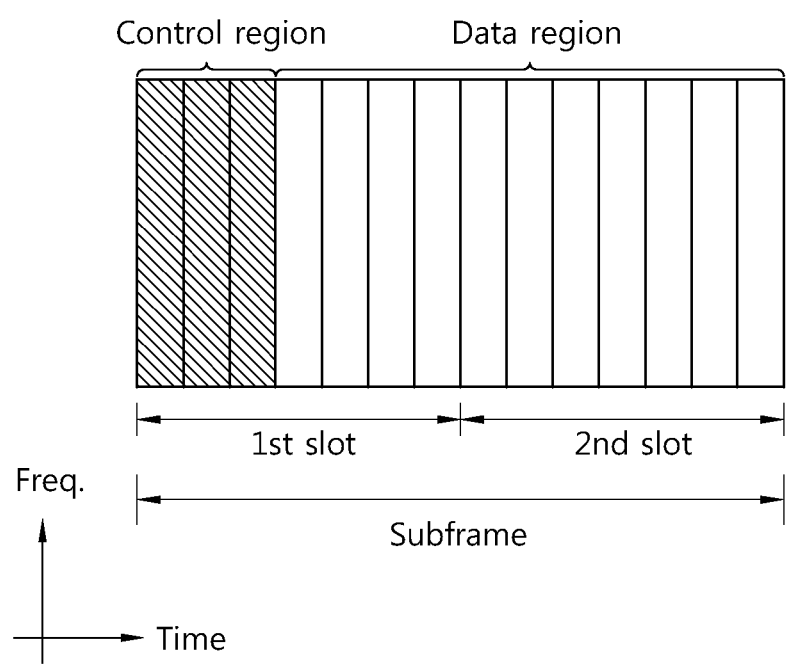
FIG. 4 shows a structure of a DL subframe.

FIG. 4 shows a structure of a DL subframe.

The DL subframe includes two slots in a time domain. Each slot includes 7 OFDM symbols in a normal CP. Up to three OFDM symbols (i.e., in case of 1.4 MHz bandwidth, up to 4 OFDM symbols) located in a front portion of a first slot within the subframe correspond to a control region to which control channels are allocated. The remaining OFDM symbols correspond to a data region to which a physical downlink shared channel (PDSCH) is allocated.

A physical downlink control channel (PDCCH) can carry a downlink shared channel (DL-SCH)'s resource allocation and transmission format, uplink shared channel (UL-SCH)'s resource allocation information, paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. A plurality of PDCCHs can be transmitted in the control region, and the UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs.

A BS determines a PDCCH format according to downlink control information (DCI) to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
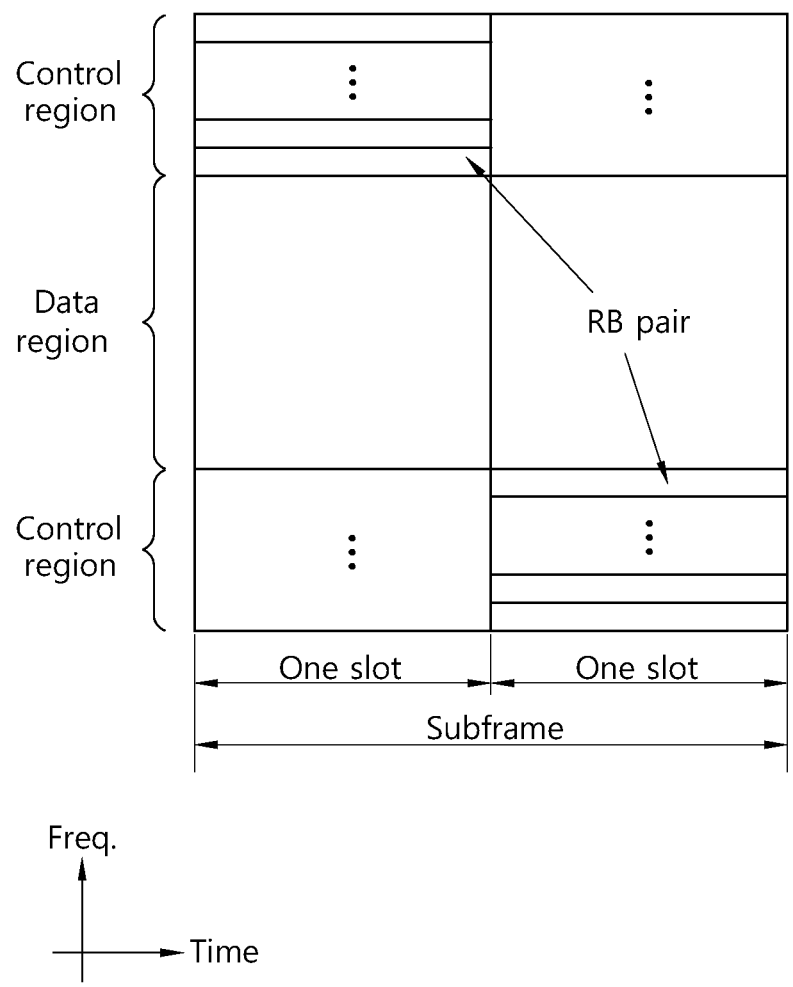
FIG. 5 shows a structure of a UL subframe.

FIG. 5 shows a structure of a UL subframe.

The UL subframe can be divided into a control region and a data region in frequency domain. A physical uplink control channel (PUCCH) for carrying UL control information is allocated to the control region. A physical uplink shared channel (PUSCH) for carrying data is allocated to the data region.

When it is indicated by a higher layer, a UE can support simultaneous transmission of the PUSCH and the PUCCH.

The PUSCH is mapped to an uplink shared channel (UL-SCH) which is a transport channel. UL data transmitted on the PUSCH may be a transport block which is a data block for the UL-SCH transmitted during TTI. The transport block may be user information. Alternatively, the UL data may be multiplexed data. The multiplexed data may be attained by multiplexing control information and the transport block for the UL-SCH. Examples of the control information multiplexed to the data include a channel quality indicator (CQI), a precoding matrix indicator (PMI), a hybrid automatic repeat request (HARM), a rank indicator (RI), etc. The UL data may consist of only control information.

The following description is about a PUCCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

The PUCCH carries various types of control information according to a format. A PUCCH format 1 carries a scheduling request (SR). In this case, an on-off keying (OOK) scheme can be used. A PUCCH format 1a carries an acknowledgement/non-acknowledgement (ACK/NACK) modulated by using bit phase shift keying (BPSK) with respect to one codeword. A PUCCH format 1b carries an ACK/NACK modulated by using quadrature phase shift keying (QPSK) with respect to two codewords. A PUCCH format 2 carries a channel quality indicator (CQI) modulated by using QPSK. PUCCH formats 2a and 2b carry CQI and ACK/NACK.

Table 1 shows a modulation scheme and the number of bits in a subframe according to a PUCCH format.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Table 2 shows the number of OFDM symbols used as a PUCCH demodulation reference signal per slot.

TABLE 2

| PUCCH format | Normal cyclic prefix | Extended cyclic prefix |
|---|---|---|
| 1, 1a, 1b | 3 | 2 |
| 2 | 2 | 1 |
| 2a, 2b | 2 | N/A |

Table 3 shows a position of an OFDM symbol to which a demodulation reference signal is mapped according to a PUCCH format.

TABLE 3

| | set of values for l | |
|---|---|---|
| PUCCH format | Normal cyclic prefix | Extended cyclic prefix |
| 1, 1a, 1b | 2, 3, 4 | 2, 3 |
| 2, 2a, 2b | 1, 5 | 3 |

Figure 6:
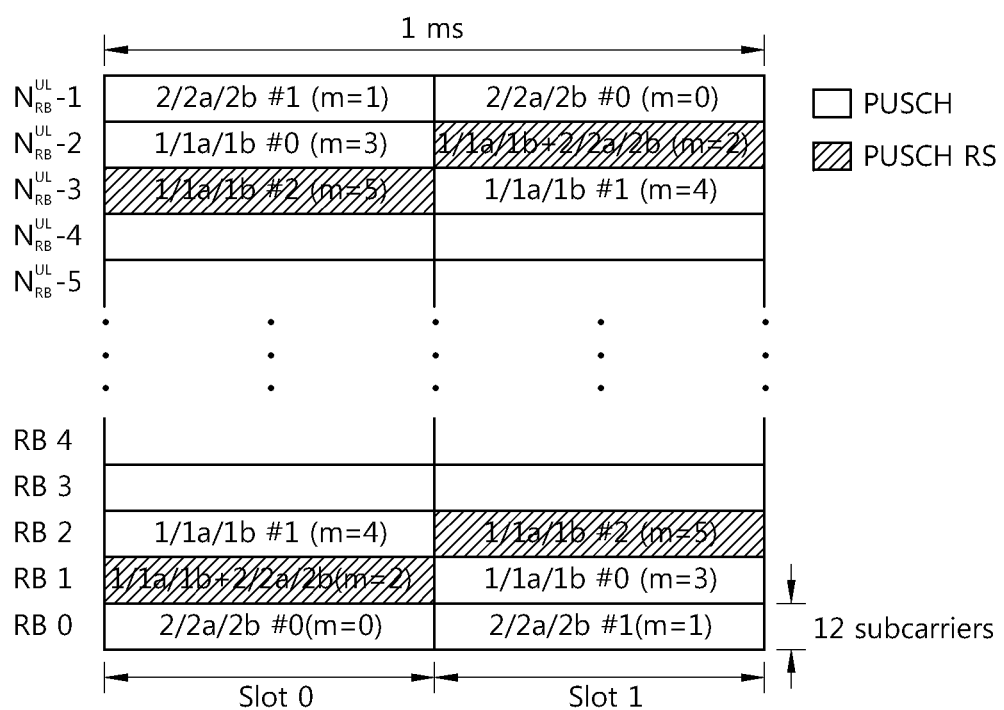
FIG. 6 shows physical mapping of a PUCCH format to a control region.

FIG. 6 shows physical mapping of a PUCCH format to a control region.

Referring to FIG. 6, the PUCCH formats 2/2a/2b are mapped and transmitted on the band-edge RBs (e.g., PUCCH region m=0, 1). A mixed PUCCH RB can be transmitted by being mapped to an adjacent RB (e.g., m=2) towards a center of the band in an RS to which the PUCCH formats 2/2a/2b are allocated. PUCCH formats 1/1a/1b by which SR and ACK/NACK are transmitted can be deployed to an RB (e.g., m=4 or m=5). The number $N^{(2)}_{RB}$ of available RBs for the PUCCH formats 2/2a/2b by which CQI is transmitted can be indicated by a UE through a broadcasting signal.

Figure 7:
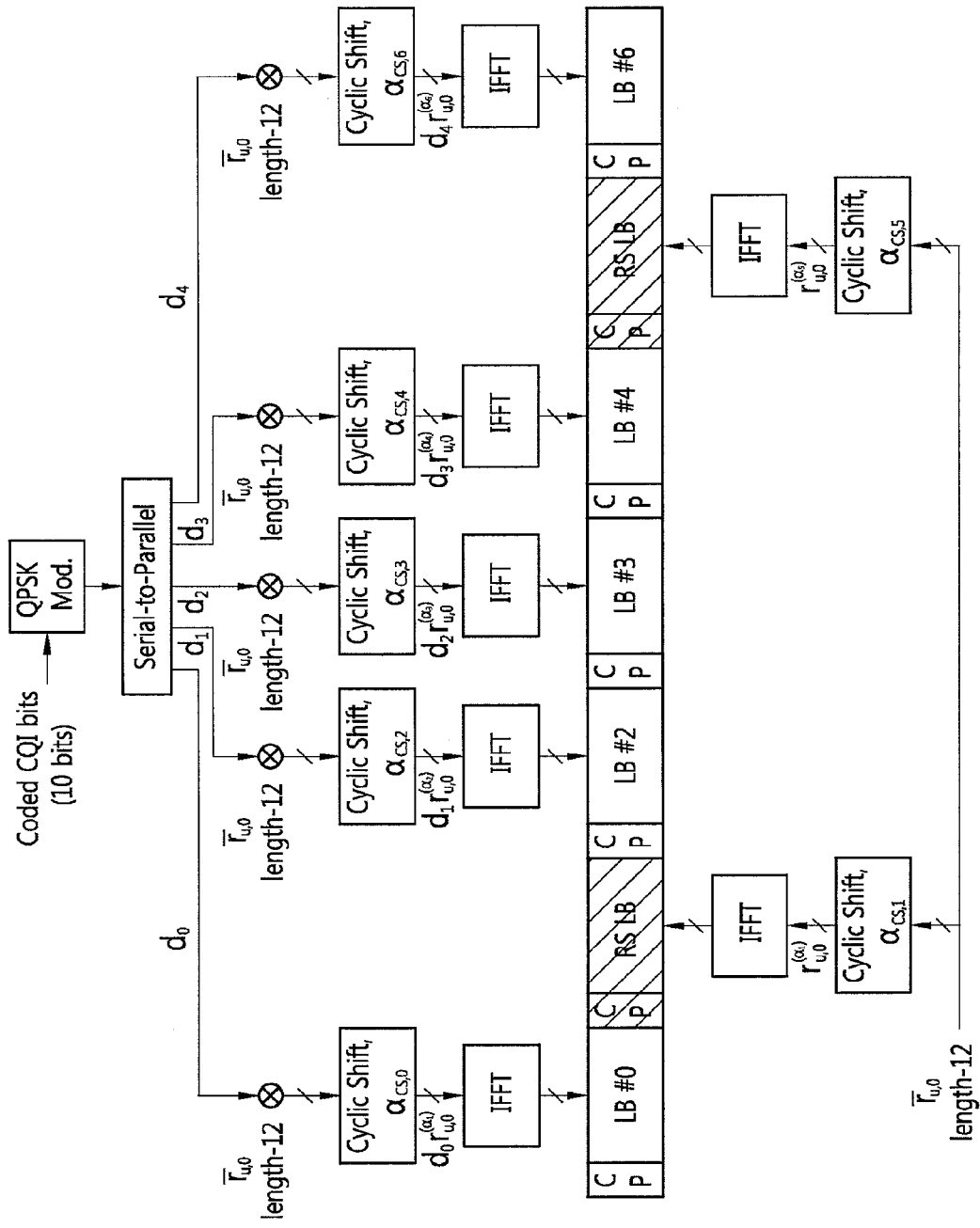
FIG. 7 shows a channel structure of PUCCH formats 2/2a/2b for one slot in a normal CP.

FIG. 7 shows a channel structure of PUCCH formats 2/2a/2b for one slot in a normal CP. As described above, the PUCCH formats 2/2a/2b are used in CQI transmission.

Referring to FIG. 7, in the normal CP case, SC-FDMA symbols 1 and 5 are used for a demodulation reference symbol (DM RS) which is a UL reference signal. In an extended CP case, an SC-FDMA symbol 3 is used for the DM RS.

10 CQI information bits are channel-coded, for example, with a coding rate of ½, thereby generating 20 coded bits. A Reed-Muller code can be used in the channel coding. After scheduling (similarly to a case where PUSCH data is scrambled to a gold sequence having a length of 31), QPSK constellation mapping is performed to generate QPSK modulation symbols (e.g., $d_0$ to $d_4$ in a slot 0). Each QPSK modulation symbol is modulated by using a cyclic shift of a base RS sequence having a length of 12, and is then subjected to OFDM modulation. Then, the resultant symbol is transmitted in each of 10 SC-FDMA symbols in a subframe. 12 equally-spaced cyclic shifts allow 12 different UEs to be orthogonally multiplexed on the same PUCCH RB. A DM RS sequence applied to the SC-FDMA symbols 1 and 5 may be the base RS sequence having a length of 12.

Figure 8:
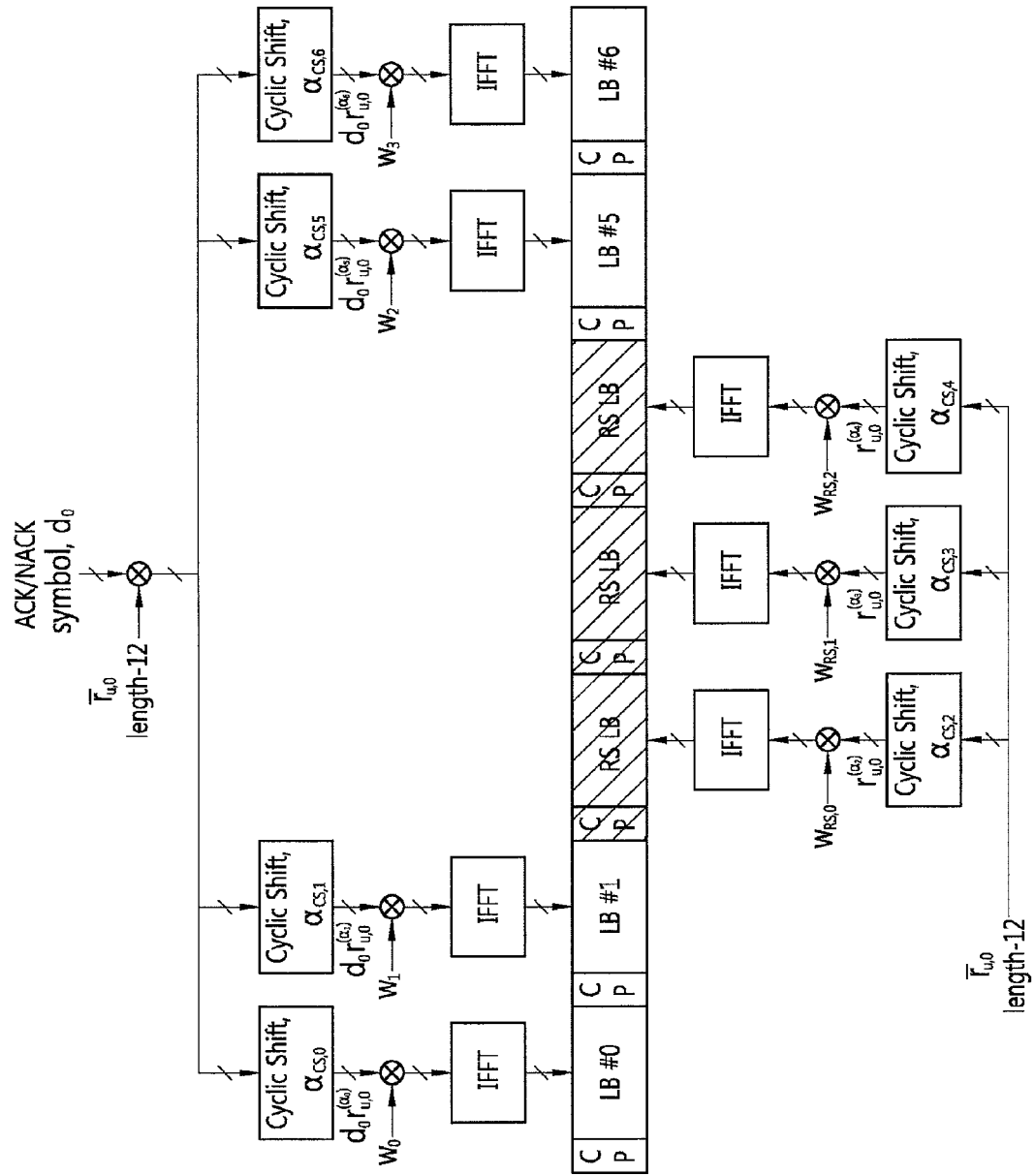
FIG. 8 shows PUCCH formats 1a/1b for one slot in a normal CP.

FIG. 8 shows PUCCH formats 1a/1b for one slot in a normal CP. A UL RS is transmitted in $3^{rd}$ to $5^{th}$ SC-FDMA symbols. In FIG. 8, $w_0$, $w_1$, $w_2$, and $w_3$ can be modulated in a time domain after inverse fast Fourier transform (IFFT) modulation is performed or can be modulated in a frequency domain before IFFT modulation is performed.

In LTE, simultaneous transmission of ACK/NACK and CQI in the same subframe can be enabled or disabled. In a case where simultaneous transmission of the ACK/NACK and the CQI is disabled, a UE may need to transmit the ACK/NACK on a PUCCH of a subframe in which CQI feedback is configured. In this case, the CQI is dropped, and only the ACK/NACK is transmitted using the PUCCH formats 1a/1b.

Simultaneous transmission of the ACK/NACK and the CQI in the same subframe can be achieved through UE-specific higher layer signaling. When simultaneous transmission is enabled, 1-bit or 2-bit ACK/NACK information needs to be multiplexed to the same PUCCH RB in a subframe in which a BS scheduler permits simultaneous transmission of the CQI and the ACK/NACK. In this case, it is necessary to preserve a single-carrier property having a low cubic metric (CM). A method of multiplexing the CQI and the ACK/NACK while preserving the single-carrier property is different between a normal CP case and an extended CP case.

First, when 1-bit or 2-bit ACK/NACK and CQI are transmitted together by using the PUCCH formats 2a/2b in the normal CP, ACK/NACK bits are not scrambled, and are subjected to BPSK (in case of 1 bit)/QPSK (in case of 2 bits) modulation to generate a single HARQ ACK/NACK modulation symbol $d_{HARQ}$. The ACK is encoded as a binary '1', and the NACK is encoded as a binary '0'. The single HARQ ACK/NACK modulation symbol $d_{HARQ}$ is used to modulate a second RS symbol in each slot. That is, the ACK/NACK is signaled by using an RS.

Figure 9:
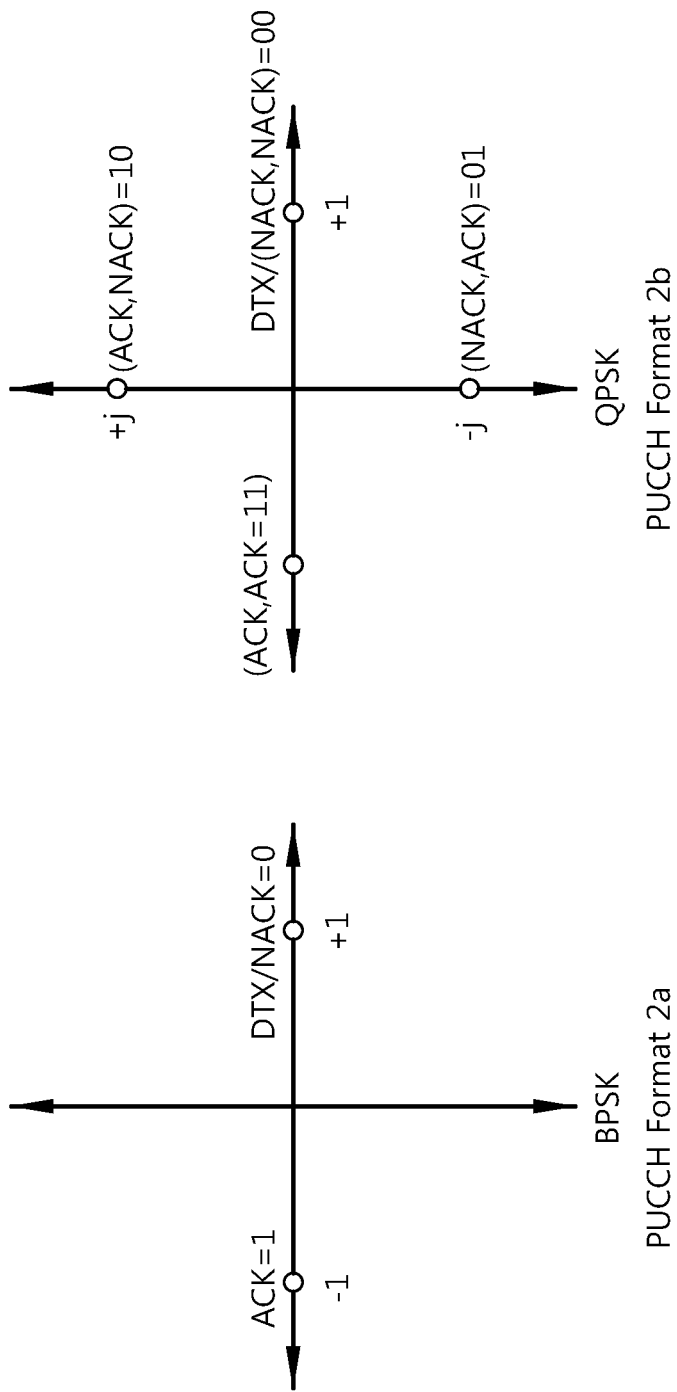
FIG. 9 shows an example of constellation mapping of ACK/NACK in a normal CP.

FIG. 9 shows an example of constellation mapping of ACK/NACK in a normal CP.

Referring to FIG. 9, NACK (or NACK, NACK in case of transmitting two DL codewords) is mapped to +1. Discontinuous transmission (DTX) implies a case where a UE fails to detect a DL grant in a PUCCH and where both of ACK are NACK are not necessarily transmitted, which results in a default NACK. The DTX is interpreted as the NACK by a BS, and triggers DL retransmission.

Next, 1- or 2-bit ACK/NACK is jointly coded with CQI in an extended CP which uses one RS symbol per slot.

Figure 10:
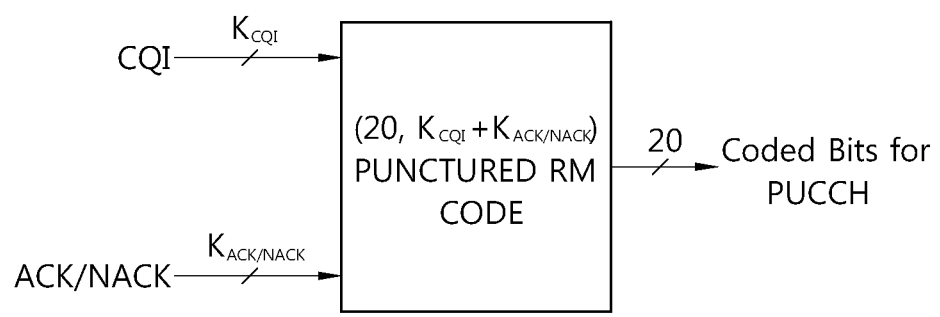
FIG. 10 shows an example of joint coding between ACK/NACK and CQI in an extended CP.

FIG. 10 shows an example of joint coding between ACK/NACK and CQI in an extended CP.

Referring to FIG. 10, a maximum number of bits of an information bit supported by a block code may be 13. In this case, a CQI bit $K_{cqi}$ may be 11 bits, and an ACK/NACK bit $K_{ACK/NACK}$ may be 2 bits. The CQI bit and the ACK/NACK bit are jointly encoded to generate a 20-bit Reed-Muller-based block code. The 20-bit codeword generated in this process is transmitted through a PUCCH having the channel structure described in FIG. 7 (in an extended CP case, one RS symbol is used per slot unlike in FIG. 7).

Table 4 below shows an example of a (20,A) RM code used in channel coding of uplink control information (UCI) of 3GPP LTE. Herein, A may denote the number of bits (i.e., $K_{cqi}+K_{ACK/NACK}$) of a bit-stream linked with a CQI information bit and an ACK/NACK information bit. If the bit-stream is denoted by $a_0, a_1, a_2, \ldots, a_{A-1}$, the bit-stream can be used as an input of a channel coding block using the (20,A) RM code.

TABLE 4

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel encoding bits $b_0$, $b_1$, $b_2$, . . . , $b_{B-1}$ can be generated by Equation 1 below.

$$b_i = \sum_{n=0}^{A-1} (a_n \cdot M_{i,n}) \bmod 2 \quad \text{[Equation 1]}$$

In Equation 1, i=0, 1, 2, . . . , B−1.

In LTE, ACK/NACK and SR can be multiplexed.

Figure 11:
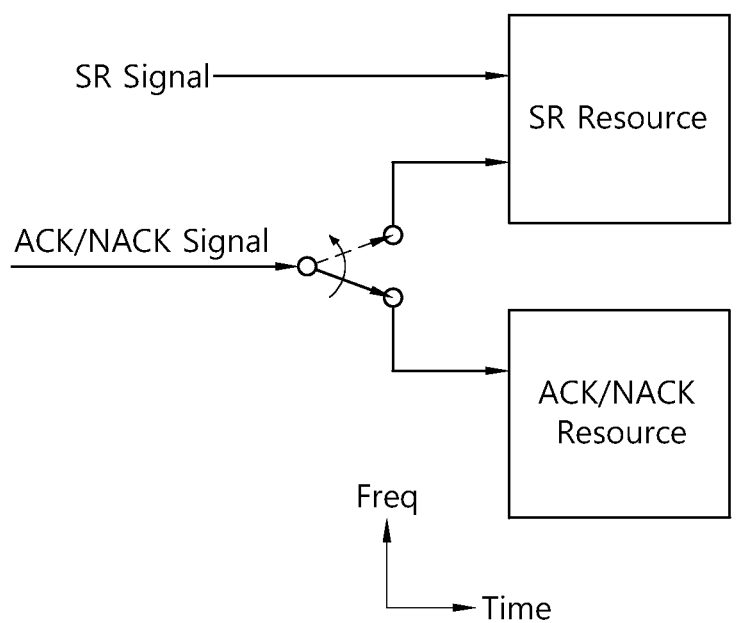
FIG. 11 shows a method of multiplexing ACK/NACK and SR.

FIG. 11 shows a method of multiplexing ACK/NACK and SR.

Referring to FIG. 11, when ACK/NACK and SR are transmitted simultaneously in the same subframe, a UE transmits the ACK/NACK by using an allocated SR resource. In this case, the SR implies positive SR. In addition, the UE may transmit ACK/NACK by using an allocated ACK/NACK resource. In this case, the SR implies negative SR. That is, according to which resource is used to transmit ACK/NACK in a subframe in which the ACK/NACK and the SR are simultaneously transmitted, a BS can identify not only the ACK/NACK but also whether the SR is positive SR or negative SR.

Figure 12:
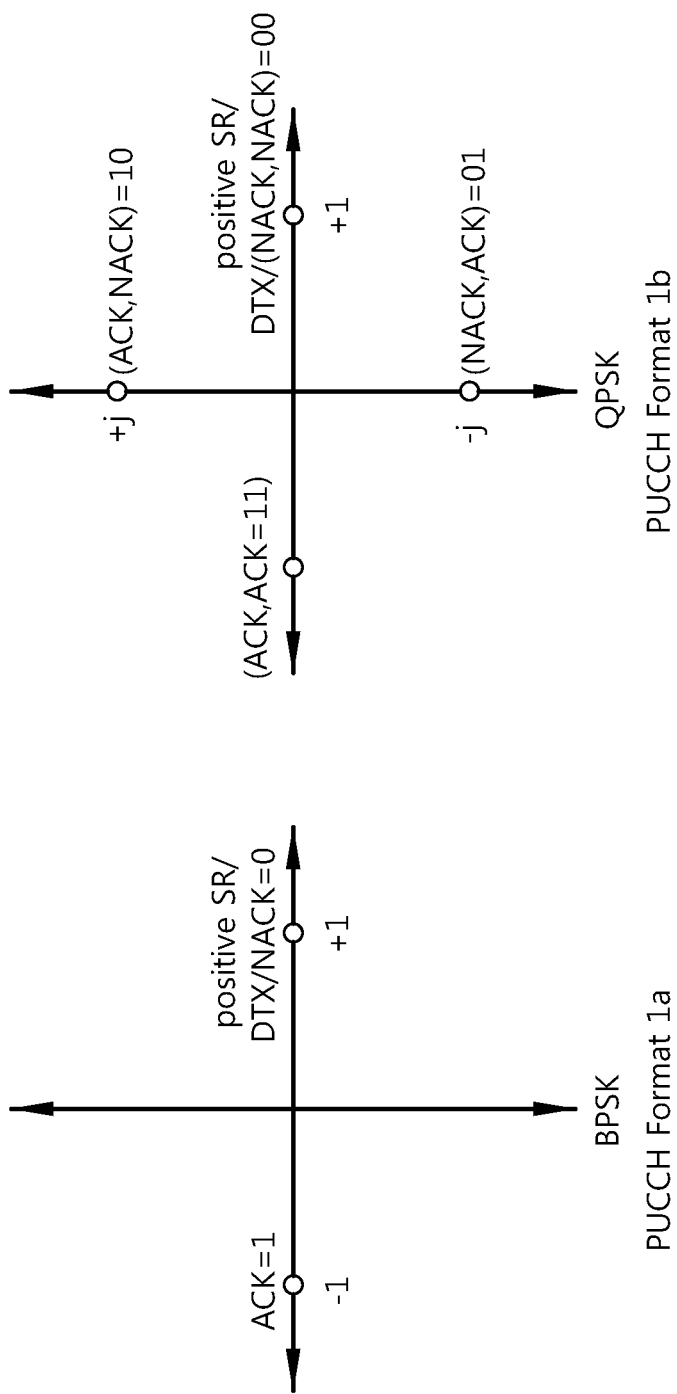
FIG. 12 shows constellation mapping when ACK/NACK and SR are simultaneously transmitted.

FIG. 12 shows constellation mapping when ACK/NACK and SR are simultaneously transmitted.

Referring to FIG. 12, DTX/NACK and positive SR are mapped to +1 of a constellation map, and ACK is mapped to −1.

Meanwhile, a wireless communication system can support a carrier aggregation system. The carrier aggregation system is a system that constitutes a broadband by aggregating one or more carriers having a smaller bandwidth than the broadband. The carrier aggregation system implies a system that configures a broadband by aggregating one or more carriers having a bandwidth smaller than that of a target broadband when the wireless communication system intends to support the broadband.

In the LTE TDD system, a UE can feed back multiple ACK/NACKs for multiple PDSCHs to a BS. This is because the UE can receive the multiple PDSCHs in multiple subframes, and can transmit ACK/NACK for the multiple PDSCHs in one subframe. In this case, there are two types of ACK/NACK transmission methods as follows.

The first method is ACK/NACK bundling. The ACK/NACK bundling is a process of combining ACK/NACK bits for multiple data units by using a logical AND operation. For example, if the UE decodes all the multiple data units successfully, the UE transmits only one ACK bit. Otherwise, if the UE fails in decoding (or detecting) any one of the multiple data units, the UE may transmit NACK or may transmit no signal as ACK/NACK.

The second method is ACK/NACK multiplexing. With ACK/NACK multiplexing, the content and meaning of the ACK/NACK for the multiple data units can be identified by combining a PUCCH resource used in actual ACK/NACK transmission and one of QPSK modulation symbols.

For example, it is assumed that up to two data units can be transmitted, and one PUCCH resource can carry two bits. It is also assumed that an HARQ operation for each data unit can be managed by one ACK/NACK bit. In this case, the ACK/NACK can be identified at a transmitting node (e.g., a BS) which transmits the data unit according to Table 5 below.

TABLE 5

| HARQ-ACK(0), HARQ-ACK(1) | $n^{(1)}_{PUCCH}$ | b(0), b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

In Table 5, HARQ-ACK(i) indicates an ACK/NACK result for a data unit i. In the above example, two data units may exist, i.e., a data unit 0 and a data unit 1. In Table 5, DTX implies that there is no data unit transmission for the HARQ-ACK(i). Alternatively, it implies that a receiving end (e.g., a UE) fails to detect the data unit for the HARQ-ACK (i). $n^{(1)}_{PUCCH,X}$ indicates a PUCCH resource used in actual ACK/NACK transmission. There are up to 2 PUCCH resources, that is, $n^{(1)}_{PUCCH,0}$ and $n^{(1)}_{PUCCH,1}$. b(0) and b(1) denote 2 bits delivered by a selected PUCCH resource. A modulation symbol transmitted using the PUCCH resource is determined by b(0) and b(1).

For one example, if the receiving end successfully receives two data units and decodes the received data units, the receiving end has to transmit two bits b(0) and b(1) in a form of (1, 1) by using a PUCCH resource $n^{(1)}_{PUCCH,1}$. For another example, it is assumed that the receiving end receives two data units, and in this case, the receiving end fails to decode 1$^{st}$ data unit and successfully decodes 2$^{nd}$ data unit. Then, the receiving end has to transmit (0, 0) by using $n^{(1)}_{PUCCH,1}$.

As such, according to a method in which the content (or meaning) of ACK/NACK is linked to a combination of a PUCCH resource and the content of an actual bit transmitted using the PUCCH resource, ACK/NACK transmission for the multiple data units is enabled by using a single PUCCH resource.

In the ACK/NACK multiplexing method, if at least one ACK exists for all data units, NACK and DTX are basically coupled as NACK/DTX. This is because a combination of a PUCCH resource and a QPSK symbol is not enough to cover all ACK/NACK combinations based on decoupling of the NACK and the DTX.

Figure 13:
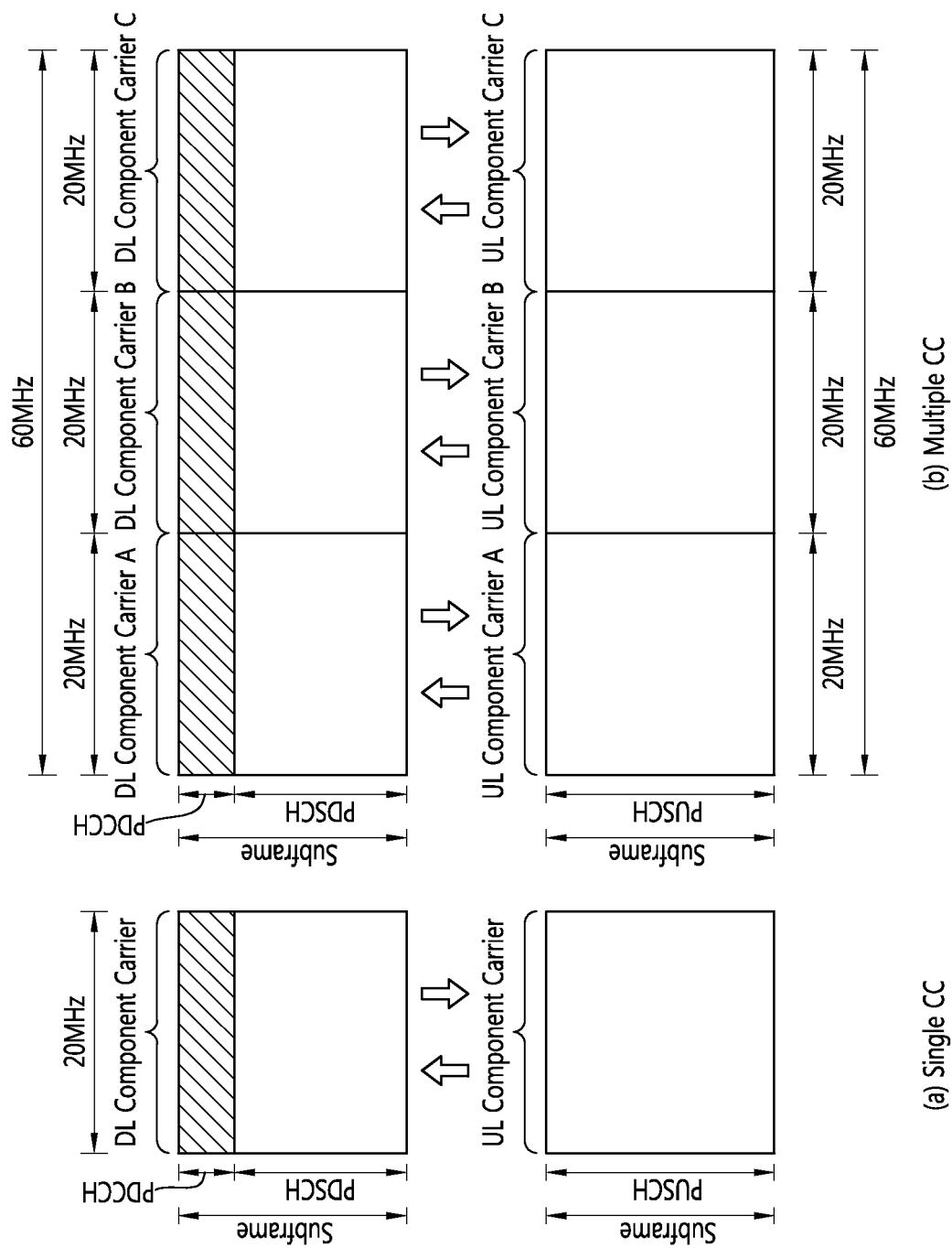
FIG. 13 shows an example of comparing a single-carrier system and a carrier aggregation system.

FIG. 13 shows an example of comparing a single-carrier system and a carrier aggregation system.

Referring to FIG. 13, only one carrier is supported for a UE in an uplink and a downlink in the single-carrier system. The carrier may have various bandwidths, but only one carrier is assigned to the UE. Meanwhile, multiple component carriers (CCs), i.e., DL CCs A to C and UL CCs A to C, can be assigned to the UE in the carrier aggregation system. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a broadband of 20 MHz or higher by using only the bandwidth of the 3GPP LTE system. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell.

In order to transmit and receive packet data through a specific cell, the UE first has to complete configuration of the specific cell. Herein, the configuration implies a state of completely receiving system information required for data transmission and reception for the cell. For example, the configuration may include an overall procedure that requires common physical layer parameters necessary for data transmission and reception, MAC layer parameters, or parameters necessary for a specific operation in an RRC layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required to receive a packet from a deactivated cell. On the other hand, in order to confirm the resource (e.g., frequency, time, etc.) allocated to the UE, the UE does not monitor or receive a control channel (i.e., PDCCH) and a data channel (i.e., PDSCH) of the deactivated cell.

A cell can be classified into a primary cell, a secondary cell, a serving cell.

The primary cell implies a cell that operates at a primary frequency. Further, the primary cell implies a cell in which the UE performs an initial connection establishment procedure or a connection re-establishment procedure with respect to the BS or a cell indicated as the primary cell in a handover procedure.

The secondary cell implies a cell that operates at a secondary frequency. Once an RRC connection is established, the secondary cell is used to provide an additional radio resource.

The serving cell is configured with the primary cell in case of a UE of which CA is not configured or which cannot provide the CA. If the CA is configured, the term 'serving cell' is used to indicate a set consisting of one or a plurality of cells among primary cells or all secondary cells.

That is, the primary cell implies one serving cell that provides security input and NAS mobility information in an RRC establishment or re-establishment state. According to UE capabilities, it can be configured such that at least one cell constitutes a serving cell together with the primary cell, and in this case, the at least one cell is called the secondary cell.

Therefore, a set of serving cells configured only for one UE can consist of only one primary cell, or can consist of one primary cell and at least one secondary cell.

A primary component carrier (PCC) denotes a CC corresponding to a primary cell. The PCC is a CC that establishes an initial connection (or RRC connection) with the BS among several CCs. The PCC serves for connection (or RRC connection) for signaling related to a plurality of CCs, and is a CC that manages UE context which is connection information related to the UE. In addition, the PCC establishes connection with the UE, and thus always exists in an activation state when in an RRC connected mode.

A secondary component carrier (SCC) denotes a CC corresponding to a secondary cell. The SCC is a CC allocated to the UE in addition to the PCC. The SCC is an extended carrier used by the UE for additional resource allocation or the like in addition to the PCC, and can be divided into an activation state and a deactivation state.

A downlink CC corresponding to the primary cell is called a downlink primary component carrier (DL PCC), and an uplink CC corresponding to the primary cell is called an uplink primary component carrier (UL PCC). In addition, in a downlink, a CC corresponding to the secondary cell is called a downlink secondary CC (DL SCC). In an uplink, a CC corresponding to the secondary cell is called a uplink secondary CC (UL SCC).

The primary cell and the secondary cell have the following features.

First, the primary cell is used for PUCCH transmission.

Second, the primary cell is always activated, whereas the secondary cell is a cell which is activated/deactivated according to a specific condition.

Third, when the primary cell experiences a radio link failure (RLF), RRC re-establishment is triggered, whereas when the secondary cell experiences the RLF, the RRC re-establishment is not triggered.

Fourth, the primary cell can change by a handover procedure accompanied by a random access channel (RACH) procedure or security key modification.

Fifth, non-access stratum (NAS) information is received through the primary cell.

Sixth, the primary cell always consists of a pair of a DL PCC and a UL PCC.

Seventh, for each UE, a different CC can be configured as the primary cell.

Eighth, a procedure such as reconfiguration, adding, and removal of the primary cell can be performed by an RRC layer. When adding a new secondary cell, RRC signaling can be used for transmission of system information of a dedicated secondary cell.

A DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC (carrier #0)+20 MHz CC (carrier #1)+20 MHz CC (carrier #2)+20 MHz CC (carrier #3)+5 MHz CC (carrier #4).

As described above, the carrier aggregation system can support multiple component carriers (CCs) unlike a single carrier system. That is, one UE can receive multiple PDSCHs through multiple DL CCs. In addition, the UE can transmit ACK/NACK for multiple PDSCHs through one UL CC (e.g., UL PCC). That is, since only one PDSCH is received in one subframe in the conventional single carrier system, it has been enough to transmit only up to two pieces of HARQ ACK/NACK (hereinafter, simply referred to as ACK/NACK for convenience of explanation) information. However, since the carrier aggregation system can transmit ACK/NACK for multiple PDSCHs through one UL CC, an ACK/NACK transmission method is required for this.

1. Multi-Bit ACK/NACK Transmission

Herein, multi-bit ACK/NACK implies an ACK/NACK bit for multiple PDSCHs. If a UE operates in an SU-MIMO mode in a DL CC and receives two codewords, then ACK/ACK, ACK/NACK, NACK/ACK, and NACK/NACK are present for the two codewords with respect to the DL CC, and if DTX is included as a message indicating that the PDCCH is not received, 5 feedback states are present in total. If the UE does not operate in the SU-MIMO mode and receives only one codeword, three feedback states (i.e., ACK, NACK, DTX) are present. Therefore, if the UE configures up to 5 DL CCs and operates in the SU-MIMO mode in all DL CCs, up to $5^5$ (=3125) feedback states can be present. This can be expressed by 12 bits. Alternatively, if NACK and DTX are mapped to the same feedback state in all DL CCs, up to $4^5$ feedback states are present, which can be expressed by 10 bits. As such, there is a need for a method of transmitting multi-bit ACK/NACK for multiple PDSCHs.

Method 1-1: Method Based on PUCCH Format 2

In this method, multi-bit ACK/NACK information on PDSCHs of multiple DL CCs is transmitted based on the PUCCH format 2.

Figure 14:
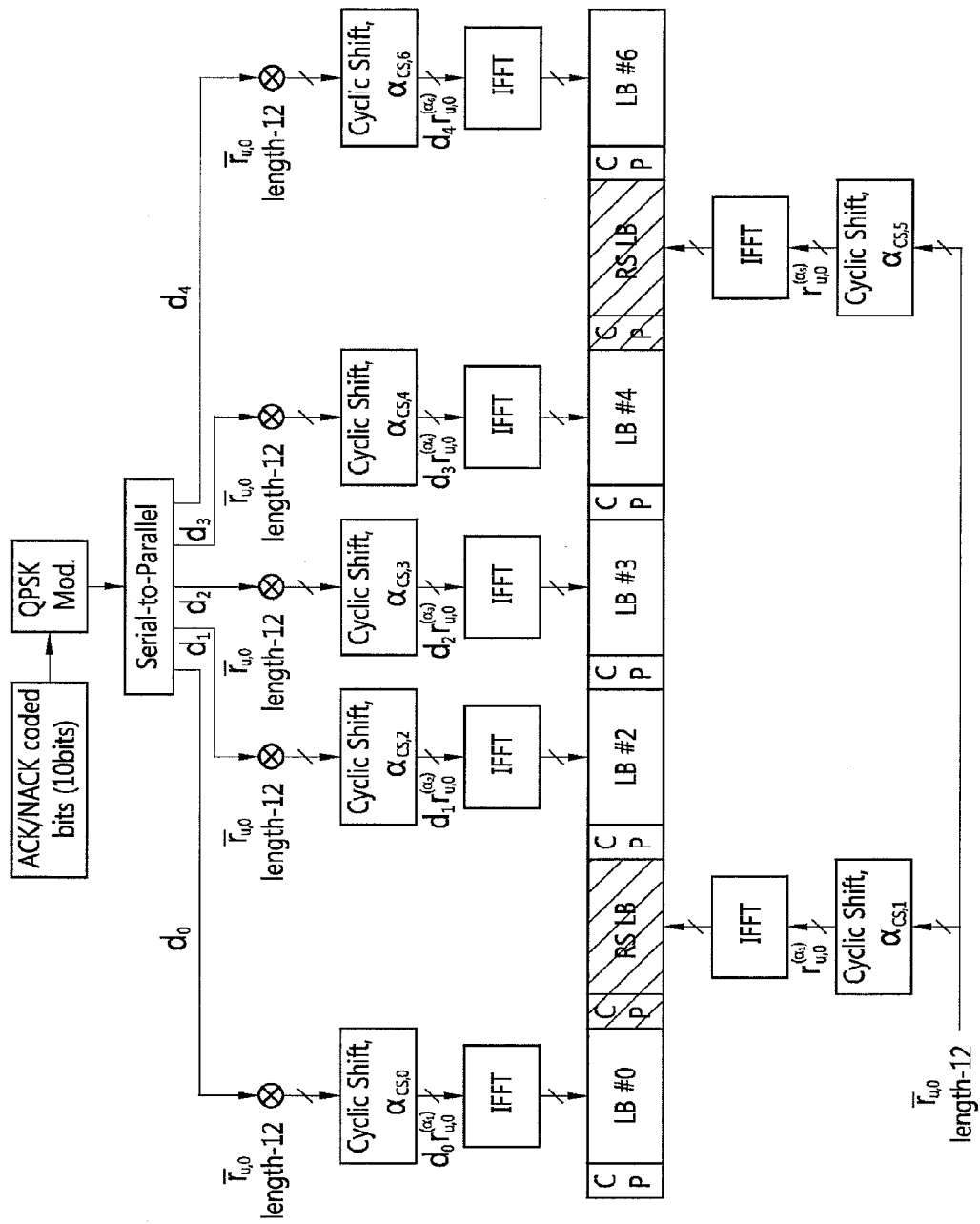
FIG. 14 shows a method based on the PUCCH format 2.

FIG. 14 shows a method based on the PUCCH format 2.

Referring to FIG. 14, a multi-bit ACK/NACK information bit (e.g., a 10-bit ACK/NACK information bit) is channel-coded, for example, with a coding rate of ½, thereby generating 20 ACK/NACK coded bits. A Reed-Muller code can be used in the channel coding. The RM code may be found in Table 4 above. QPSK constellation mapping is performed on the ACK/NACK coded bit to generate QPSK modulation symbols (e.g., $d_0$ to $d_4$ in a slot 0). Each QPSK modulation symbol is modulated by using a cyclic shift of a base RS sequence having a length of 12, and is then subjected to OFDM modulation. Then, the resultant symbol is transmitted in each of 10 SC-FDMA symbols in a subframe. 12 equally-spaced cyclic shifts allow 12 different UEs to be orthogonally multiplexed on the same PUCCH RB. A DM RS sequence applied to the SC-FDMA symbols 1 and 5 may be the base RS sequence having a length of 12.

When the multi-bit ACK/NACK information is transmitted by using the method based on the PUCCH format 2, any one of the following two channel coding methods can be used.

Method 1-1-1: Fast Codebook Adaptation

In this method, the multi-bit ACK/NACK to be transmitted in a subframe is mapped sequentially starting from a first basis of an RM code (i.e., a first column vector) to optimize ACK/NACK transmission performance for multiple DL CCs. That is, this method performs channel coding in such a manner that, in a multi-bit ACK/NACK information bit stream, a first ACK/NACK information bit (i.e., MSB) is mapped to the first basis of the RM code and a next ACK/NACK information bit is mapped to a second basis of the RM code. Since the RM code is designed to have optimal performance when the same payload is channel-coded by sequentially mapping from a first basis, optimal performance can be shown by performing mapping between the ACK/NACK and the basis of the RM code. However, when codeword DTX occurs, a payload size may be misaligned between the BS and the UE in this method. Therefore, the BS preferably reports the total number of PDSCH codewords and/or a PDSCH counter by using a downlink assignment index (DAI) and a DL control signal.

Method 1-1-2: Slow Codebook Adaptation

In this method, the multi-bit ACK/NACK is mapped to a basis of an RM code which is fixed semi-statically when it is mapped to the basis of the RM code. For example, the UE can perform channel coding by mapping a corresponding ACK/NACK information bit per codeword of each DL CC to the basis of the RM code determined semi-statically. The UE performs channel coding by mapping an ACK/NACK information bit regarding a PDSCH received per frame to the basis of the predetermined RM code. The BS can perform decoding by assuming a payload suitable for the number of codewords of a DL CC configured in ACK/NACK decoding. Therefore, ACK/NACK can be decoded without occurrence of payload misalignment. However, since an optimized RM code cannot be used in this method, performance may deteriorate to some extent in comparison with fast codebook adaptation. However, this method has an advantage in that there is no need to report the total number of PDSCH codewords and/or the PDSCH counter by using a DL control signal such as DAI.

Figure 15:
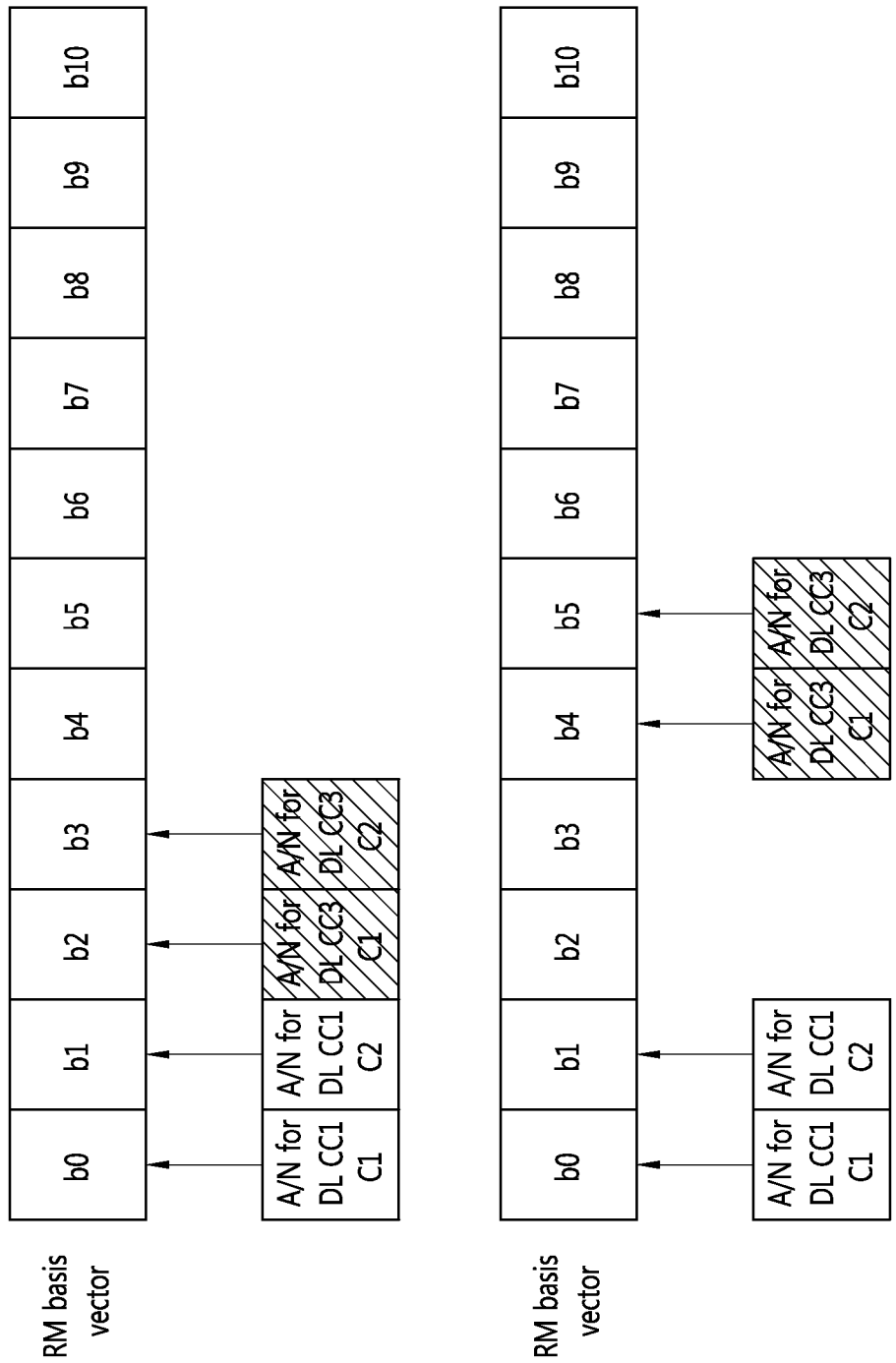
FIG. 15 shows an example of the aforementioned fast codebook adaptation and slow codebook adaptation.

FIG. 15 shows an example of the aforementioned fast codebook adaptation and slow codebook adaptation.

It is assumed in FIG. 15 that 5 DL CCs are assigned to a UE, and up to two codewords can be received in each of a DL CC 1 to a DL CC 4 (i.e., a MIMO mode), and only one codeword can be received in a DL CC 5 (i.e., a non-MIMO mode). In addition, it is also assumed that the UE receives a PDSCH through the DL CC 1 and the DL CC 3 in any subframe. A basis (i.e., a column vector) of an RM code is denoted by b0, b1, . . . , b10.

In this case, when using fast codebook adaptation, as shown n FIG. 15(a), an ACK/NACK information bit for a codeword 1 (C1) of the DL CC 1 is mapped to a first basis b0, and an ACK/NACK information bit for a codeword 2 (C2) of the DL CC 1 is mapped to a second basis b1. Further, an ACK/NACK information bit for a codeword 1 (C1) of the DL CC 2 is mapped to a third basis b2, and an ACK/NACK information bit for a codeword 2 (C2) of the DL CC 2 is mapped to a fourth basis b3.

That is, an ACK/NACK information bit for a codeword of each DL CC is sequentially mapped to a basis of an RM code.

If slow codebook adaptation is used in the above case, as shown in FIG. 15(b), the ACK/NACK information bit for the codeword of each DL CC is mapped to a basis of a predetermined RM code. For example, codewords 1 and 2 of the DL CC 1 can be mapped in advance to b0 and b1, codewords 1 and 2 of the DL CC 2 can be mapped in advance to b2 and b3, codewords 1 and 2 of the DL CC 3 can be mapped in advance to b4 and b5, codewords 1 and 2 of the DL CC 4 can be mapped in advance to b6 and b7, and codewords 1 and 2 of the DL CC 5 can be mapped in advance to b8 and b9. Then, under the aforementioned assumption, channel coding is performed such that the ACK/NACK information bit is mapped to the basis predetermined as shown in FIG. 15(b).

Method 1-2: Method Based on Block Spreading

The method based on block spreading implies a method of multiplexing a modulation symbol sequence obtained by modulating multi-bit ACK/NACK by using a block spreading code. The method based on the block spreading can use SC-FDMA. Herein, the SC-FDMA is a transmission scheme in which IFFT is performed after DFT spreading is performed. The SC-FDMA is also called DFT-spread OFDM (DFT-s OFDM). A peak-to-average power ratio (PAPR) to a cubic metric (CM) can be decreased in the SC-FDMA. The method based on block spreading can be used to multiplex the multi-bit ACK/NACK for multiple UEs in the same resource block.

Figure 16:
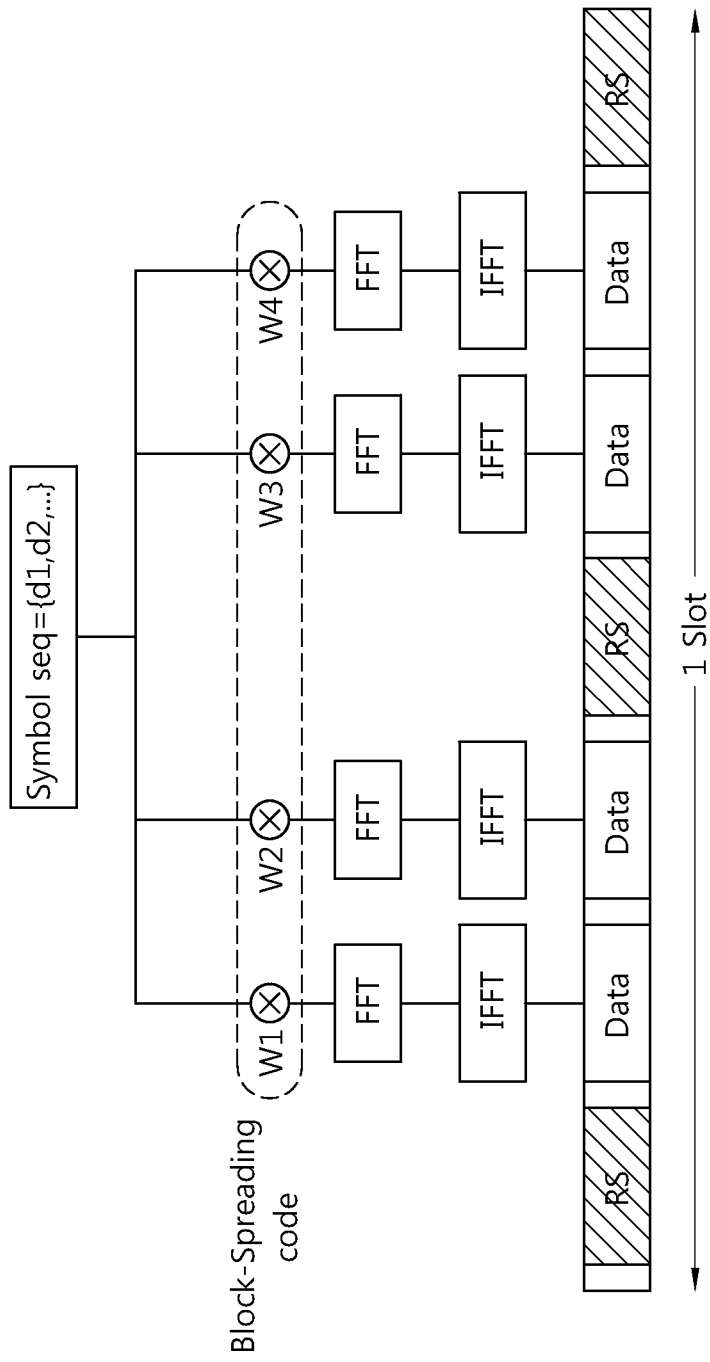
FIG. 16 shows an example of a method based on block spreading.

FIG. 16 shows an example of a method based on block spreading.

Referring to FIG. 16, a modulation symbol sequence {d1, d2, . . . } is spread by applying a block spreading code. Herein, the modulation symbol sequence may be sequence of modulation symbols obtained in such a manner that multi-bit ACK/NACK information bits are channel-coded (using an RM code, a TBCC, a punctured RM code, etc.) to generate ACK/NACK coded bits, and the ACK/NACK coded bits are modulated (e.g., using QPSK). In this case, the ACK/NACK coded bits can be generated by applying the aforementioned fast codebook adaptation or slow codebook adaptation. In addition, although a case where three RS symbols exist in one slot is shown in the example of FIG. 16, two RS symbols may be present, and in this case, a block spreading code with a length 5 can be used. Table 6 below shows an example of the block spreading code.

TABLE 6

| index | $N_{SF}^{PUCCH} = 5$ | $N_{SF}^{PUCCH} = 4$ |
|---|---|---|
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 −1 −1 +1] |
| 3 | [1 $e^{j6\pi/5}$ $e^{j2\pi/5}$ $e^{j8\pi/5}$ $e^{j4\pi/5}$] | [+1 +1 −1 −1] |
| 4 | [1 $e^{j8\pi/5}$ $e^{j6\pi/5}$ $e^{j4\pi/5}$ $e^{j2\pi/5}$] | — |

In Table 6 above, $N^{PUCCH}_{SF}$ denotes a spreading factor (SF).

Method 1-3: SF Reduction

This method is modified from PUCCH formats 1a/1b used in LTE rel-8 as a method of decreasing an SF of an orthogonal code to allow one UE to be able to multiplex a greater amount of ACK/NACK information to the same resource block. For example, since the SF is 4 in the conventional PUCCH formats 1a/1b, the number of ACK/NACK modulation symbols that can be transmitted in one slot is 1. However, the number of ACK/NACK modulation symbols that can be transmitted by one UE in one slot is increased to 2 or 4 by decreasing the SF to 2 or 1. Therefore, the greater amount of ACK/NACK information can be transmitted.

Method 2: Multi-Code ACK/NACK Transmission

In this method, transmission is performed by extending the conventional ACK/NACK transmission, i.e., a method of transmitting ACK/NACK information by using the PUCCH formats 1a/1b, to multiple PUCCHs. For example, if a UE receives N PDSCHs in total, N PUCCHs can be transmitted simultaneously by using the PUCCH formats 1a/1b.

Method 3: ACK/NACK Multiplexing (ACK/NACK Selection)

In this method, ACK/NACK multiplexing used in LTE rel-8 TDD is applied to FDD of a carrier aggregation environment. In TDD, ACK/NACK information on a PDSCH received in multiple subframes is transmitted in one subframe. This mechanism is applied to FDD. That is, upon receiving multiple PDSCHs in multiple DL CCs, a UE transmits ACK/NACK by using one (or more) PUCCH (i.e., PUCCH format 1b). In other words, this method is a method of carrying information by using two types of hypotheses, i.e., which PUCCH channel is used in transmission among several PUCCH channels capable of ACK/NACK transmission for multiple PDSCHs received in multiple DL CCs, and which value is used in transmission as a symbol value (i.e., QPSK or M-PSK) of the channel.

In a method described hereinafter, a UE multiplexes and transmits different uplink control information (UCI) in a carrier aggregation system. For example, the UE can perform multiplexing between ACK/NACK and SR and between ACK/NACK and CQI and then can transmit the multiplexed signal in the carrier aggregation system.

First, a method of multiplexing SR and ACK/NACK for multiple PDSCH received in multiple DL CCs will be described.

Method 4-1: RS Symbol Modulation

In this method, SR information is transmitted by being phase-modulated to an RS symbol of an ACK/NACK signal in an SR subframe in which an SR can be transmitted (herein, the ACK/NACK signal implies an ACK/NACK signal transmitted by using any one of the aforementioned methods 1 to 3). That is, in this method, 1-bit SR information is multiplexed by allowing some RS symbols and the remaining RS symbols to be in phase or out phase among multiple RS symbols used in ACK/NACK signal transmission. In addition, if there is no ACK/NACK signal transmission in the SR subframe, the SR information is transmitted using the PUCCH format 1 type (i.e., on-off keying) similarly to the conventional method. In this method 4-1, RS modulation adaptation can be determined according to which method is used in transmission among the aforementioned methods 1-1 to 1-3, method 2, and method 3.

When the ACK/NACK signal is transmitted by using the aforementioned method 1-1, two RS symbols are used per one slot. Therefore, it can be transmitted by modulating an SR to a phase difference between a first RS symbol and a second RS symbol in a slot.

When the ACK/NACK signal is transmitted by using the aforementioned method 1-2, two or three RS symbols are used per one slot. If two RS symbols are used, an SR is modulated to a phase difference between the two RS symbols. If three RS symbols are used, an SR is modulated to a phase difference between two consecutive RS symbols. That is, an SR is modulated to a phase difference between a first RS symbol and a second RS symbol in a slot or between the second RS symbol and a third RS symbol.

When the ACK/NACK signal is transmitted by using the aforementioned method 1-3, method 2, or method 3, three RS symbols are used per one slot. In this case, an SR is preferably modulated to a phase difference between two consecutive RS symbols.

In addition, when ACK/NACK is transmitted by applying the aforementioned method 2, RS modulation is preferably applied to all PUCCHs for SR detection in multiple PUCCH transmission.

Since an SR reception rate may deteriorate when SR information is modulated to a phase difference between RS symbols and demodulation performance may deteriorate when performing ACK/NACK demodulation as described above, the UE can transmit an RS symbol by boosting power of the RS symbol in an SR subframe to avoid performance deterioration.

Method 4-2: Fallback

In this method, when SR transmission is performed in an SR subframe simultaneously with ACK/NACK transmission for multiple PDSCHs, ACK/NACK information is bundled to create a 1-bit or 2-bit bundled ACK/NACK bit, and the bundled ACK/NACK bit is transmitted using a resource reserved for SR transmission. If SR transmission is not necessary in the SR subframe, the ACK/NACK information can be transmitted by using the aforementioned methods 1 to 3. If ACK/NACK transmission is not necessary in the SR subframe, the SR information is transmitted using the PUCCH format 1 (i.e., on-off keying) through an SR resource.

Any one of the following four methods can be used as a method of bundling ACK/NACK information in the present invention.

1) Method of transmitting ACK/NACK bits for all PDSCHs by performing a logical AND operation to make the ACK/NACK bits one ACK/NACK bit.

2) Method of performing bundling per codeword by considering an SU-MIMO mode. That is, in this method, ACK/NACK for a first codeword of each DL CC is bundled to create one ACK/NACK, and ACK/NACK for a second codeword of each DL CC is bundled to create another ACK/NACK. In this case, if any DL CC operates not in the SU-MIMO mode but in a single codeword mode, ACK/NACK for a codeword of the DL CC can be bundled together when ACK/NACK bundling is performed on the first codeword.

3) Method of bundling ACK/NACK information according to a transmission mode of each DL CC. For example, in this method, ACK/NACK information for DL CCs in the single codeword mode is bundled among DL CCs to create one ACK/NACK, and ACK/NACK information for DL CCs in the SU-MIMO mode is bundled to create two ACK/NACKs.

4) Method of dividing multiple DL CCs by a predetermined group and transmitting ACK/NACK information for all DL CCs in each group by bundling the ACK/NACK information. For example, the number of groups may be 2, and can be reported in advance to the UE by using a higher layer signal (RRC signal), a CC activation/deactivation signal, etc.

In the aforementioned method 4-2, ACK/NACK for a PDSCH transmitted in a specific DL CC, e.g., a DL PSS, in the SR subframe can be transmitted using the conventional method (i.e., PUCCH formats 1a/1b), and ACK/NACK for the remaining DL CCs can be transmitted using the aforementioned methods 1 to 3. For example, if SR transmission is necessary, the ACK/NACK for the specific DL CC is transmitted through a resource reserved for SR transmission, and the ACK/NACK for the remaining DL CCs can be transmitted using the aforementioned methods 1 to 3.

Method 4-3: Joint Coding of ACK/NACK and SR

As described above, in LTE Rel-8, SR transmission and ACK/NACK transmission may collide in a subframe capable of SR transmission when there is no PUSCH transmission. In this case, an SR resource is used in ACK/NACK transmission. If SR transmission is not necessary in the subframe, ACK/NACK is transmitted using a resource reserved for ACK/NACK, and no signal is transmitted for the SR resource. Meanwhile, since ACK/NACK for multiple PDSCHs is transmitted in a carrier aggregation system such as an LTE-A system, if there is no PUSCH transmission, it is necessary to modify the conventional SR and ACK/NACK multiplexing method.

In this method, SR information is multiplexed by adding one bit to a payload of multi-bit ACK/NACK in an SR subframe. For example, in this method, if an N-bit information bit payload is channel-coded for ACK/NACK transmission in a subframe other than the SR subframe and thus an M-bit (M≥N) coded bit is generated and transmitted, SR information is added in the SR subframe and thus an (N+1) bit information bit payload is channel-coded, thereby generating and transmitting an M-bit (M≥N) coded bit. That is, SR and ACK/NACK are transmitted by using joint coding.

Alternatively, in order to avoid increase in the payload of the information bit in the SR subframe, the number of bits of the ACK/NACK information or the number of states can be decreased, and then one bit for the SR can be added, thereby being able to perform transmission without the increase in the payload of the information bit.

Any one of the following three methods can be used as a method of compressing ACK/NACK information to decrease the number of bits of the ACK/NACK information or the number of states.

1) Method of not transmitting a DTX state: that is, the DTX state can be processed as NACK. For example, although one of five states (i.e., ACK/ACK, ACK/NACK, NACK/ACK, NACK/NACK, DTX) have to be reported if a certain DL CC operates in an SU-MIMO mode, the number of states can be decreased to four if the DTX state is transmitted as NACK. Likewise, by transmitting DTX as a NACK state in a DL CC operating in a single codeword mode, three states (i.e., ACK, NACK, DTX) can be decreased to two states (i.e., ACK, NACK). As such, the method of decreasing the DTX states can apply to either all DL CCs or some CCs.

2) When there is a DL CC operating in an SU-MIMO mode, spatial bundling is used. The spatial bundling decreases the number of states by performing bundling between ACK/NACKs for codewords of different DL CCs. The spatial bundling can also apply to either all DL CCs or some DL CCs.

3) Combination of the Above Methods 1) and 2)

Figure 17:
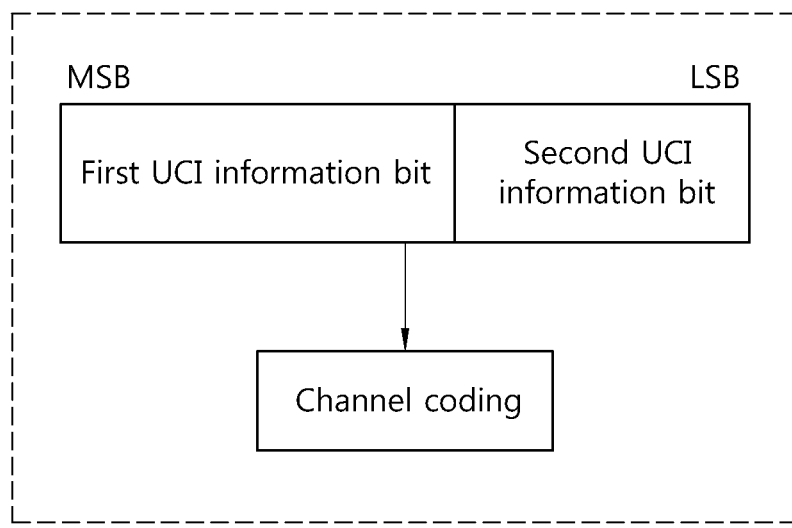
FIG. 17 shows joint coding of ACK/NACK and SR in a carrier aggregation system.

FIG. 17 shows joint coding of ACK/NACK and SR in a carrier aggregation system.

Referring to FIG. 17, a UE generates a bit-stream by concatenating a first UCI information bit and a second UCI information bit, and performs channel coding on the generated bit-stream. The channel coding may be any one of simple repetition, simplex coding, RM coding, punctured RM coding, tail-biting convolutional coding (TBCC), low density parity checking (LDPC) coding, turbo coding, etc. The first UCI information bit may be ACK/NACK, and the second UCI information bit may be SR (1 bit). That is, an SR information bit can be appended to the end of the ACK/NACK information bits. It can be expressed that the SR information bit is concatenated to a least significant bit (LSB) in a bit-stream of the ACK/NACK and the SR. Concatenating of the SR information bit to the LSB implies that the SR information bit is mapped to a rightmost basis. i.e., a rightmost column, of an RM code when the SR information bit is jointly coded with the ACK/NACK information bit.

Alternatively, the first UCI information bit may be SR (1 bit), and the second UCI information bit may be ACK/NACK. It can be expressed that the SR information bit is appended to a most significant bit (MSB) in a bit-stream of the ACK/NACK and the SR. Then, a first basis b0 of the RM code and the SR information bit are mapped when performing channel coding.

Figure 18:
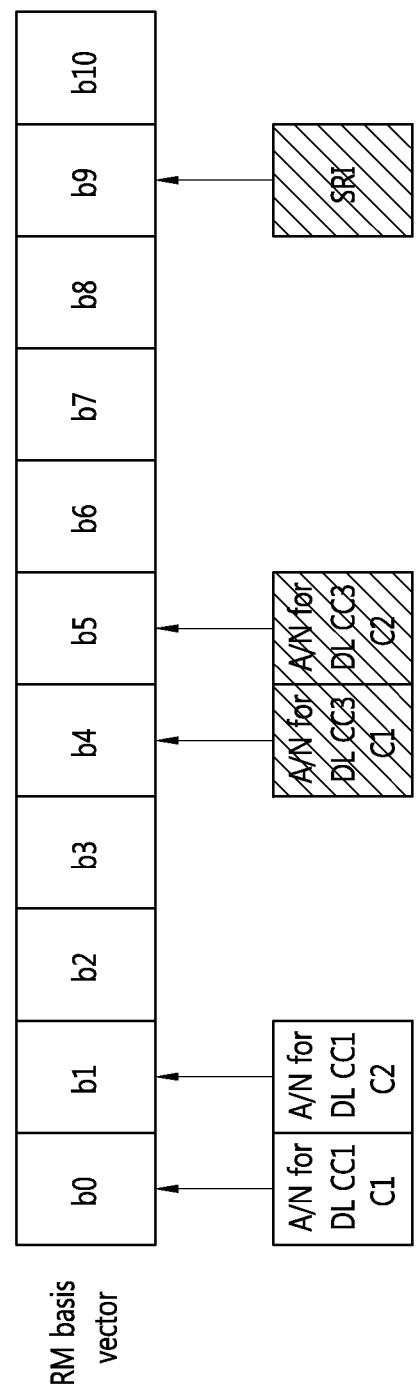
FIG. 18 shows a process for locating an SR information bit to an LSB and performing channel coding in case of using slow codebook adaptation.
Figure 19:
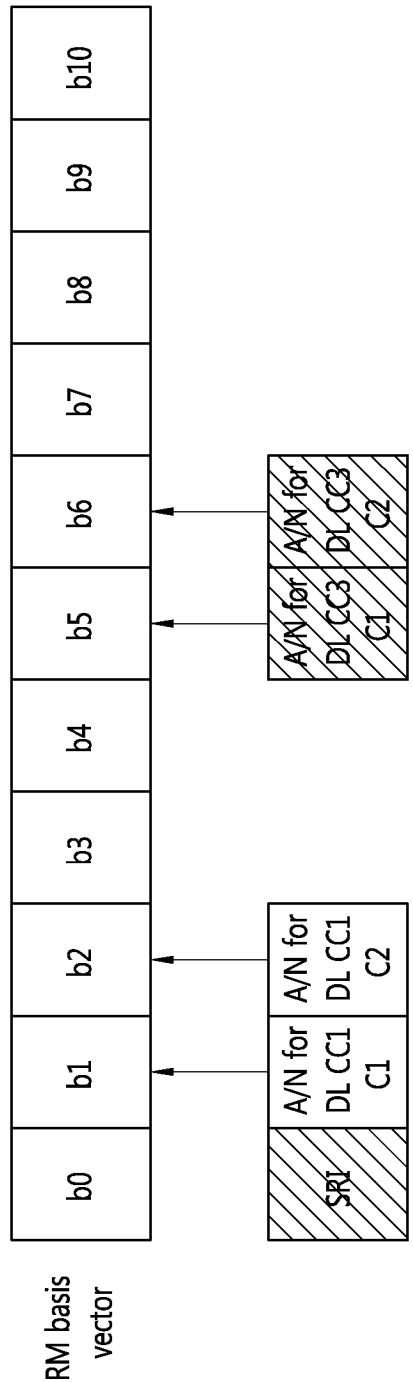
FIG. 19 shows an example of a process for locating an SR information bit to an MSB and performing channel coding when using slow codebook adaptation.

It is assumed in FIG. 18 and FIG. 19 that 5 DL CCs are assigned to a UE, and up to two codewords can be received in each of a DL CC 1 to a DL CC 4 (i.e., a MIMO mode), and only one codeword can be received in a DL CC 5 (i.e., a non-MIMO mode). In addition, it is also assumed that the UE receives a PDSCH through the DL CC 1 and the DL CC 3 in any subframe. A basis (i.e., a column vector) of an RM code is denoted by b0, b1, . . . , b10.

FIG. 18 shows a process for locating an SR information bit to an LSB and performing channel coding in case of using slow codebook adaptation.

Referring to FIG. 18, when ACK/NACK is transmitted using the aforementioned slow codebook adaptation, the SR information bit can be located to the LSB. Then, channel coding is performed by mapping the SR information bit to a basis b9 which comes next to RM code bases b0 to b8 reserved for ACK/NACK transmission. In doing so, without having to change mapping of the basis of the RM code and the ACK/NACK semi-statically fixed, only one more RM code basis is added for the SR information bit. Therefore, there is an advantage in that decoding can be performed in a BS without having to modify the conventional mapping of the ACK/NACK and the basis of the RM code.

FIG. 19 shows an example of a process for locating an SR information bit to an MSB and performing channel coding when using slow codebook adaptation.

Referring to FIG. 19, the SR information bit is located to an MSB when the SR information bit and an ACK/NACK information bit are jointly coded. This implies that it is mapped to a leftmost basis of an RM code. For example, when the ACK/NACK information bit and the SR information bit are transmitted using the PUCCH format 2, the SR information bit is mapped to a first basis of the RM code. When ACK/NACK is transmitted using the aforementioned slow codebook adaptation (i.e., when the ACK/NACK per CC and the basis of the RM code are fixed semi-statically), a probability that channel coding can be performed with an optimized RM code is increased if the SR information bit is located to the MSB. In other words, since there is a high probability that bases used in RM encoding (in comparison with a method of assigning the SR information bit to the LSB) are sequentially used from a first basis, it is advantageous in terms of RM code performance.

As such, since the SR information bit is mapped to a first basis in an SR subframe when ACK/NACK is transmitted using slow codebook adaptation, mapping of the basis of the RM code and the ACK/NACK determined semi-statically can change. Therefore, the UE can implicitly shift mapping of the ACK/NACK information bit and the basis of the RM code.

In addition, if it is not the SR subframe, the conventional semi-statically mapping of the RM code basis and ACK/NACK information bit can be directly used while allowing implicit shift of the mapping of the ACK/NACK information bit and the RM code basis in order to ensure mapping of the SR information bit and the RM code basis in the SR subframe.

Figure 20:
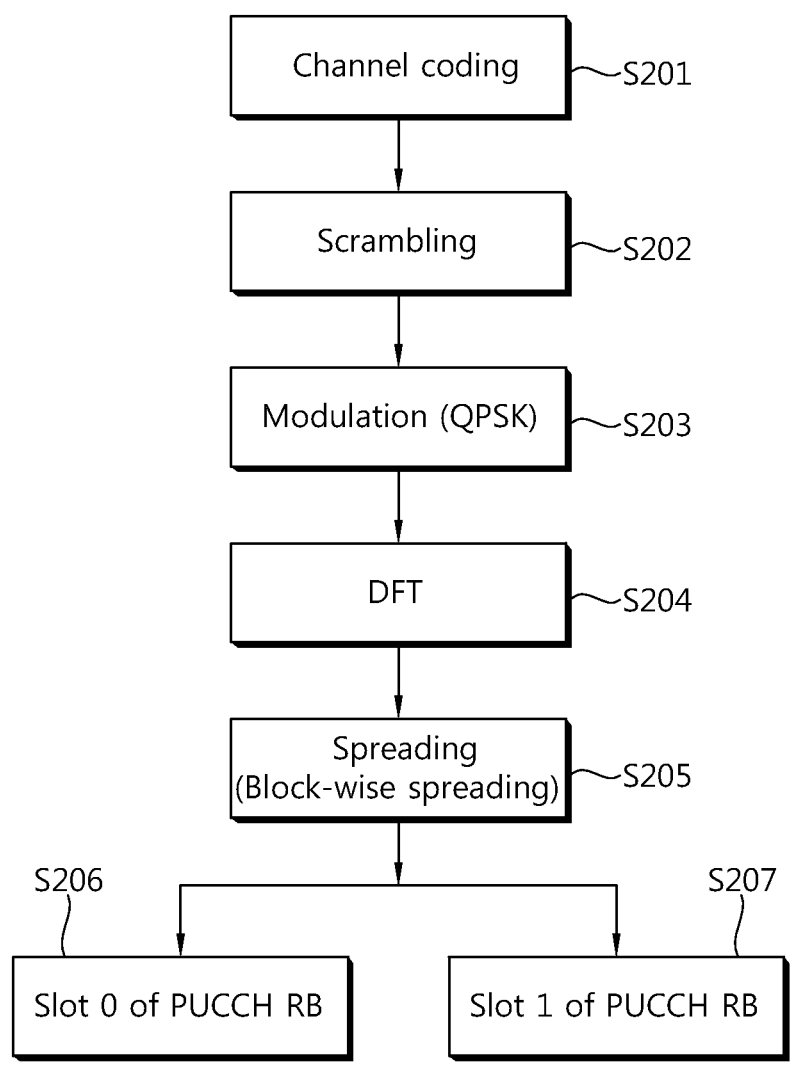
FIG. 20 shows an example of a process in which a UE performs joint coding by combining different UCI and then maps it to a resource block of each slot.

FIG. 20 shows an example of a process in which a UE performs joint coding by combining different UCI and then maps it to a resource block of each slot. ACK/NACK and SR are shown as an example of the different UCI in FIG. 20.

Referring to FIG. 20, channel coding is performed on a bit-stream consisting of an ACK/NACK information bit and an SR information bit for each CC (step S201). The SR information bit can be concatenated to a last part of the ACK/NACK information bit. An RM code may be used in channel coding. Table 7 below shows an example of the RM code applied to the bit-stream consisting of the ACK/NACK information bit and the SR information bit.

TABLE 7

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |

TABLE 7-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

An encoding information bit generated as a result of channel coding can be rate-matched by considering a resource to be mapped and a modulation symbol order. For inter-cell interference (ICI) randomization with respect to the generated encoding information bit, cell-specific scrambling using a scrambling code corresponding to a cell ID or UE-specific scrambling using a scrambling code corresponding to a UE ID (for example, a radio network temporary identifier (RNTI)) can be applied (step S202).

The scrambled encoding information bit is modulated by the use of a modulator (step S203). A modulation symbol sequence consisting of a QPSK symbol configured by modulating the scrambled encoding information can be generated. The QPSK symbol may be a complex modulation symbol having a complex value.

With respect to QPSK symbols in each slot, discrete Fourier transform (DFT) for generating a single carrier waveform is performed in each slot (step S204).

With respect to the QPSK symbol subjected to DFT, block-wise spreading is performed in an SC-FDMA symbol level by using a predetermined spreading code or spreading code determined through dynamic signaling or radio resource control (RRC) signaling (step S205). That is, a modulation symbol sequence is spread by using an orthogonal sequence to generate a spread sequence. The spread sequence includes a sequence generated by multiplying some modulation symbols included in the modulation symbol sequence by an element of the orthogonal sequence. The generated sequence can be transmitted by being assigned to each subcarrier in an SC-FDMA symbol. The number of some modulation symbols may be equal to the number of subcarriers included in a resource block.

A spreading code may be found in Table 6 above. A spreading factor of the spreading code can vary depending on a system, and can be predetermined or can be reported to the UE through DCI or RRC signaling. A format of such control channels is called the PUCCH format 3.

The spread sequence is mapped to a subcarrier in the resource block (steps S206 and S207). Thereafter, it is converted into a time-domain signal by using inverse fast Fourier transform (IFFT), is then attached with a CP, and is then transmitted via a radio frequency (RF) unit.

Figure 21:
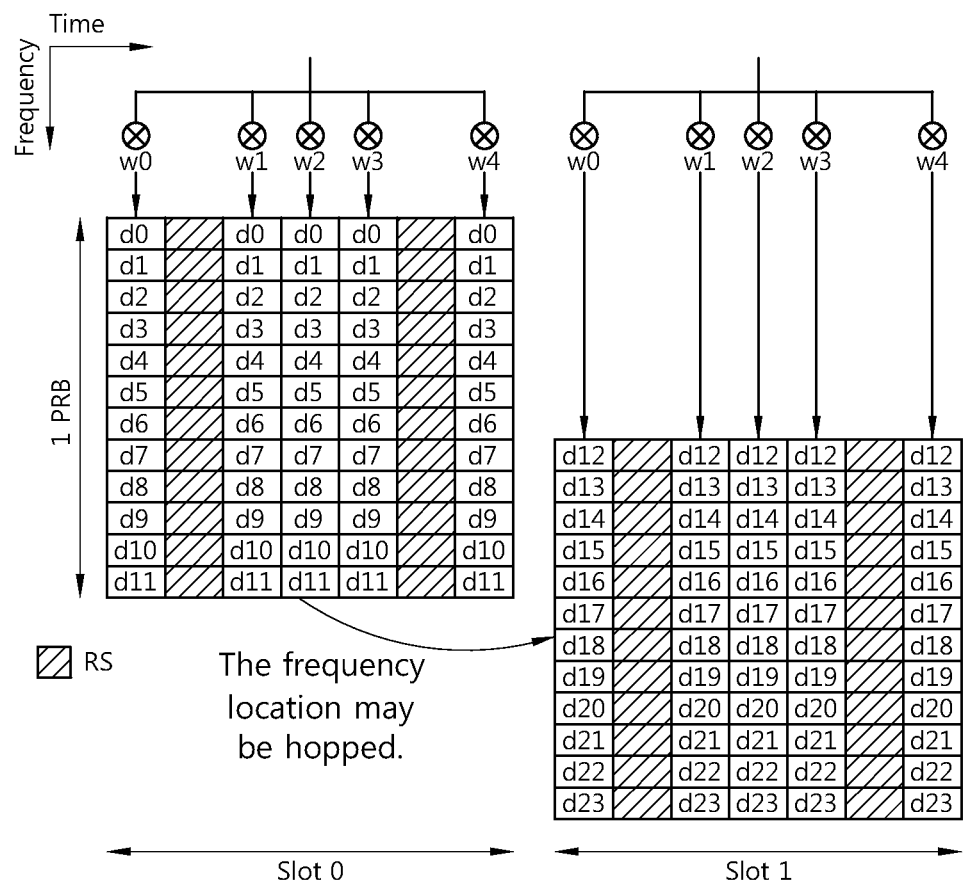
FIG. 21 shows an example of mapping spread QPSK symbols to a subcarrier in a resource block in a normal CP.

FIG. 21 shows an example of mapping spread QPSK symbols to a subcarrier in a resource block in a normal CP.

Referring to FIG. 21, each of QPSK symbols d0 to d11 and d12 to d23 is time-spread across 5 SC-FDMA symbols in one slot. A reference signal is mapped to $2^{nd}$ and $6^{th}$ SC-FDMA symbols in each slot. This is the same as a location to which the reference signal is mapped when using the PUCCH formats 2/2a/2b in LTE rel-8.

Method 4-4: New Resource Allocation for SR

In this method, in a case where a UE transmits multi-bit ACK/NACK by using the aforementioned method 1, when an SR resource is reserved for SR transmission, a resource capable of transmitting the multi-bit ACK/NACK is reserved instead of reserving a PUCCH format 1/1a/1b resource. That is, in this method, ACK/NACK is transmitted using a multi-bit ACK/NACK resource if the SR is not transmitted in an SR subframe, and multi-bit ACK/NACK is transmitted using a resource reserved for SR transmission if the SR is transmitted in the SR subframe. In this case, a resource for the SR is preferably reserved when the UE is configured to operate in a multi-bit ACK/NACK mode.

Method 4-5: Additional Resource Allocation for SR

When a UE transmits ACK/NACK by using the aforementioned method 1-2, since a symbol for transmitting ACK/NACK is multiplexed with an orthogonal code, up to 4 or 5 pieces of ACK/NACK information of the UE can be multiplexed. On the other hand, an RS symbol has two types of resources that can be multiplexed, i.e., cyclic shift (CS) of an RS sequence and an orthogonal code of an RS. Therefore, RS multiplexing capability may be larger. In this method, SR information can be transmitted using an RS multiplexing resource (i.e., the CS of the RS sequence and/or the orthogonal code of the RS) that can be additionally used. For example, the UE can be allowed to use multiple (preferably 2) RS sequence CSs in the SR subframe so that SR information (i.e., negative/positive SR) can be transmitted according to which RS sequence CS is used among the multiple RS sequence CSs. For example, when the UE transmits an RS by using an RS sequence CS #1, a BS may recognize it as negative SR, and when the UE transmits an RS by using an RS sequence CS #2, the BS may recognize it as positive SR. The BS can detect the SR by detecting reception energy of a plurality of available RS sequence CSs.

In another exemplary embodiment, SR information can be transmitted using an orthogonal code of an RS. Two or three RS symbols can be used in one slot in the aforementioned method 1-2. Therefore, SR information (negative/positive SR) can be transmitted according to which orthogonal code is used between a length-2 orthogonal code and a length-3 orthogonal code. The BS can receive the SR information by detecting energy of available orthogonal codes of the RS. In addition, it is also possible to consider an SR transmission method using a combination of the aforementioned two types of resources (i.e., the CS of the RS sequence and the orthogonal code of the RS).

A resource (i.e., the CS of the RS sequence and/or the orthogonal code of the RS) additionally used for SR transmission is preferably allocated in advance to the UE by the BS so that the UE can use the resource for the SR subframe.

Method 4-6: Piggyback of ACK/NACK Only for Specific CC

In this method, for SR transmission, a UE first ensures an SR resource (e.g., a resource capable of PUCCH format 1a/1b transmission). If SR transmission is not necessary in an SR subframe, ACK/NACK is transmitted using the aforementioned methods 1, 2, and 3 for example. Otherwise, if the SR transmission needs to be transmitted in the SR subframe, only ACK/NACK information for a specific DL CC(s) (e.g., a DL PCC) is transmitted by modulating it to an SR resource by using of BPSK or QPSK modulation according to the PUCCH formats 1a/1b. If ACK/NACK of a different DL CC other than the specific DL CC is present, ACK/NACK transmission of the different DL CC can be dropped.

When the UE transmits ACK/NACK according to the present invention, the BS can assign a specific number of DL grants to prevent dropping of unnecessary ACK/NACK transmission. Herein, the specific number is less than or equal to the maximum number of ACK/NACKs that can be transmitted using an ensured SR resource (e.g., up to 2 ACK/NACKs in case of the PUCCH formats 1a/1b), and the DL grants are located 4 ms prior to the SR subframe.

Method 4-7: Higher-Order Modulation

In this method, higher-order modulation (e.g., 8PSK, 16QAM, etc.) is used to modulate ACK/NACK having a greater number of bits than 2 bits to an SR resource, instead of modulation ACK/NACK information having up to 2 bits to the SR resource by using BPSK or QPSK similarly to the conventional LTE Rel-8. As a result, the ACK/NACK information having two or more bits can be modulated to the SR resource. In this method, only ACK/NACK information for a specific CC(s) can be modulated as described in the method 4-6. According to this method, a BS can assign a specific number of DL grants to compulsively prevent dropping of unnecessary ACK/NACK transmission. Herein, the specific number is less than or equal to the maximum number of ACK/NACKs that can be transmitted using an ensured SR resource, and the DL grants are located 4 ms prior to the SR subframe.

Hereinafter, a method in which ACK/NACK and CQI are multiplexed and transmitted by a UE in a carrier aggregation system will be described.

As described above, if there is no PUSCH transmission in LTE Rel-8, CQI transmission and ACK/NACK transmission may collide in a CQI subframe capable of periodic CQI transmission. In this case, if simultaneous transmission of CQI and ACK/NACK is possible, an ACK/NACK signal is multiplexed by using phase modulation to a second RS symbol in a slot of a PUCCH format 2 by which CQI is transmitted. However, ACK/NACK for multiple PDSCHs is transmitted in a carrier aggregation system such as an LTE-A system. Therefore, if there is no PUSCH transmission, there is a need to modify the conventional periodic CQI and ACK/NACK multiplexing method. Hereinafter, a periodic CQI and ACK/NACK multiplexing method applicable to the carrier aggregation system such as the LTE-A system will be described.

Method 5-1: Fallback

In this method, a 1-bit or 2-bit bundled ACK/NACK signal is generated by bundling ACK/NACK information for multiple PDSCHs in a CQI subframe, and thereafter the bundled ACK/NACK signal and CQI are transmitted by using PUCCH formats 2/2a/2b (i.e., by using an RS phase difference). ACK/NACK bundling may use any one of schemes described in the aforementioned method 4-2.

In addition, in the method 5-1, ACK/NACK for a specific DL CC can be transmitted using the PUCCH formats 2/2a/2b, and ACK/NACK for a PDSCH of the remaining DL CCs other than the specific DL CC can be transmitted using the aforementioned methods 1 to 3.

Method 5-2: Joint Coding and Bundling

In this method, ACK/NACK information for multiple PDSCHs is channel-coded together with CQI information in a CQI subframe and is then transmitted through a physical channel. A UE can transmit ACK/NACK information for all received PDSCHs by being jointly coded together with the CQI without compression. Alternatively, the UE can decrease the number of states of the ACK/NACK information or compress the number of bits and thereafter can transmit the ACK/NACK information by being jointed coded with the CQI.

A bundled ACK/NACK bit can be generated by bundling ACK/NACK information for multiple PDSCHs. The CQI and the bundled ACK/NACK bit can be jointly coded and then can be transmitted by using (or applying) the PUCCH format 2. ACK/NACK bundling can use any one of schemes described in the aforementioned method 4-2.

In addition, when ACK/NACK information and CQI are jointly coded, if the number of bits of a bit-stream consisting of an ACK/NACK information bit and a CQI information bit is less than or equal to a specific bit number (e.g., the number of bits that can be supported by an RM code when ACK/NACK and CQI are transmitted using the PUCCH format 2 type), the ACK/NACK information bit and the CQI information bit are transmitted by performing joint coding, and otherwise, the CQI information can be dropped and thus only ACK/NACK can be transmitted.

When the UE operates in a time division duplexing (TDD) mode, and the UE uses the aforementioned method based on block spreading for multiple ACK/NACK transmission, the following joint coding can be taken into account.

In a subframe in which the CQI is transmitted, the ACK/NACK information is compressed for each CC (e.g., compressed into 2 bits) to generate the bundled ACK/NACK. The bundled ACK/NACK can be generated into up to 10 bits when the UE uses up to 5 CCs by aggregating the CCs. The bundled ACK/NACK and the CQI (e.g., up to 11 bits) can be transmitted by being jointly coded using the PUCCH format 3.

A method of compressing ACK/NACK information for each CC is as follows. A UE transmits information regarding the number of ACKs for a PDSCH received in each DL CC and for an SPS release PDCCH in a subframe in which CQI is transmitted. In this case, the UE does not detect DTX indicating a failure in receiving of the PDCCH, and can transmit the number of ACKs (i.e., an ACK counter) only when there is no NACK for all received PDSCHs (or PDCCHs). If there is even one NACK for the all received PDCCHs, the ACK counter which is set to a value of 0 can be transmitted.

In addition, the number of ACKs received for each DL CC can be transmitted by being compressed into 2 bits as shown in Table 8 or Table 9 below.

TABLE 8

| ACK counter | HARQ-ACK states |
|---|---|
| 0 | 00 |
| 1 | 10 |
| 2 | 01 |
| 3 | 11 |
| 4 | 10 |
| 5 | 01 |
| 6 | 11 |
| 7 | 10 |
| 8 | 01 |
| 9 | 11 |

TABLE 9

| ACK counter | HARQ-ACK states |
|---|---|
| 0 | 00 |
| 1 | 01 |
| 2 | 10 |
| 3 | 11 |
| 4 | 01 |
| 5 | 10 |
| 6 | 11 |
| 7 | 01 |
| 8 | 10 |
| 9 | 11 |

Referring to Table 8, if the HARQ-ACK state is '10', the number of ACKs indicated by the ACK counter may be 1, 4, or 7. Since the BS knows the number of DL grants assigned to the UE, the BS can predict the number of ACKs indicated by the ACK counter. For example, it is assumed that the BS assigns 3 DL CCs to the UE, and each DL CC operates in an SU-MIMO mode. In this case, if the UE feeds back '10' as the HARQ-ACK state, the BS can predict '4' as the number of ACKs indicated by the ACK counter. This is because there is a low probability that only one ACK is transmitted when 6 codewords are transmitted through 3 DL CCs, and it is impossible to feed back 7 ACKs. Therefore, the BS can predict that the number of ACKs indicated by the ACK counter is 4.

Alternatively, ACK/NACK for DL CCs configured to a MIMO mode can be preferentially subjected to spatial bundling. That is, the UE can transmit ACK/NACK by bundling the ACK/NACK for each codeword between DL CCs operating in the SU-MIMO mode. For example, when a DL CC 1 and a DL CC 2 operate in the MIMO mode and are assigned to one UE, the UE can perform spatial bundling in such a manner that ACK/NACK for a codeword 1 of the DL CC 1 and ACK/NACK for a codeword 2 of the DL CC 2 are bundled through a logical AND operation, and ACK/NACK for a codeword 2 of the DL CC 1 and ACK/NACK for a codeword 2 of the DL CC 2 are bundled through the logical AND operation. In this case, the ACK counter may imply the number of ACKs subjected to spatial bundling for each DL CC.

Although the UE is set to the TDD mode in the method 5-2, it can be limitedly applied only for a case where DL subframe:UL subframe (i.e., a ratio or the number of DL subframes with respect to one UL subframe) is not 1:1 (and/or 2:1).

In addition, the method 5-2 can be limitedly applied only for a case where the number of ACK/NACK bits transmitted in a subframe other than a CQI subframe in which the UE transmits CQI exceeds 10 bits. The method 5-2 may be configurable by a choice of the BS, that is, by using RRC signaling or L1,2 signaling.

In addition, the method 5-2 can perform ACK/NACK bundling according to the following embodiment. In a case where ACK/NACK is transmitted without spatial bundling in a subframe other than a CQI subframe in which CQI is transmitted, if the number of ACK/NACK bits to be fed back without bundling in the CQI subframe does not exceed X bits (e.g., X=10), CQI and ACK/NACK can be jointly coded and can be transmitted using the PUCCH format 3 without bundling. If the number of ACK/NACK bits to be fed back without bundling in the CQI subframe exceeds the X bits, spatial bundling is first attempted to generate spatial bundled ACK/NACK, and if the number of spatial bundled ACK/NACK bits is less than or equal to the X bits, the spatial bundled ACK/NACK and the CQI are transmitted by being jointly coded using the PUCCH format 3. If the number of spatial bundled ACK/NACK bits still exceeds the X bits, 2-bit ACK/NACK for each CC and CQI can be transmitted by being jointly coded using the PUCCH format 3 according to the aforementioned ACK counter scheme. In doing so, there is an advantage in that a compression level of the ACK/NACK can be minimized when the UE transmits the ACK/NACK and the CQI by performing joint coding.

In addition, ACK/NACK bundling can be performed in the method 5-2 according to another embodiment as follows.

If the ACK/NACK is transmitted by being spatial bundled in a subframe other than a CQI subframe in which the CQI is transmitted, in the CQI subframe in which the CQI is transmitted, if the number of spatial bundled ACK/NACK bits does not exceed X bits (e.g., X=10), the ACK/NACK is transmitted using the PUCCH format 3 after performing joint coding with the CQI without additional bundling. Otherwise, if the number of spatial bundled ACK/NACK bits exceeds the X bits, the 2-bit ACK/NACK per CC can be transmitted using the PUCCH format 3 by being jointly coded together with the CQI according to the aforementioned ACK counter scheme. This method has an advantage in that a compression level of the ACK/NACK can be minimized when the UE transmits the ACK/NACK jointly coded with the CQI.

If DL subframe:UL subframe is not 2:1 or 1:1, spatial bundling can be performed on ACK/NACK for a CC configured to operate in the MIMO mode, and thereafter the 2-bit ACK/NACK per CC can be transmitted by being jointly coded together with the CQI by using the PUCCH format 3 according to the aforementioned ACK counter scheme.

If DL subframe:UL subframe is 1:1, the ACK/NACK and the CQI can be transmitted by being jointly coded using the PUCCH format 3 without bundling or with only spatial bundling.

Alternatively, if DL subframe:UL subframe is 2:1, the ACK/NACK and the CQI can be transmitted by being jointly coded using the PUCCH format 3 without bundling or with only spatial bundling. In this case, the following operation can be taken into account.

If the UE configures two or less DL CCs, the UE may not perform spatial bundling on the ACK/NACK for the DL CC and may transmit the CQI and the ACK/NACK by performing joint coding using the PUCCH format 3. If the UE configures more than two DL CCs, the UE performs spatial bundling and then transmits the ACK/NACK joint coded with the CQI by using the PUCCH format 3.

Method 5-3: Piggyback of Only ACK/NACK for Specific CC

In this method, when CQI and ACK/NACK for multiple DL CCs must be transmitted simultaneously, only ACK/NACK information for a specific DL CC (e.g., a DL PCC) is transmitted using the PUCCH format 2a type (i.e., a scheme using RS modulation), and ACK/NACK of the remaining CCs other than the specific DL CC is dropped.

When using this method, the BS can assign a specific number of DL grants. Herein, the specific number is less than or equal to the maximum number of ACK/NACKs that can be transmitted in an ensured CQI subframe (e.g., up to 2 ACK/NACKs in case of the PUCCH formats 2a/2b), and the DL grants are located 4 ms prior to the CQI subframe. Then, dropping of unnecessary ACK/NACK transmission can be compulsively prevented.

Hereinafter, a method of determining transmit power of a PUCCH when a UE transmits different UCI in a carrier aggregation system will be described.

A case where different UCI is multiplexed by using joint coding will be considered. Examples of such a case include a case where ACK/NACK and SR are jointly coded in the aforementioned carrier aggregation system and a case where ACK/NACK and CQI are jointly coded. Herein, a payload of an information bit is more increased in the case where the ACK/NACK is jointly coded with the different UCI than the case where joint coding is not performed. A different power offset value can be assigned per UCI when transmitting the different UCI.

Alternatively, when N-bit CQI is transmitted and when the same N-bit signal is transmitted by combining CQI and ACK/NACK, the different power offset value can be assigned to the different UCI since higher performance is required for the ACK/NACK.

Alternatively, when the ACK/NACK is transmitted by being jointly coded with the different UCI, the applied power offset value can be set to a power value that satisfies a condition required in ACK/NACK transmission.

When the ACK/NACK is transmitted by being jointly coded with the different UCI (i.e., SR, CQI, etc.), the power offset value can be assigned by treating the different UCI as if it is the ACK/NACK. For example, when the N-bit signal is transmitted by combining the SR and the ACK/NACK, it is possible to apply the same transmit power as the case of transmitting only the N-bit ACK/NACK. This is to avoid performance deterioration of ACK/NACK multiplexed with the different UCI. For example, if a serving cell c is a primary cell, a PUCCH transmit power $P_{PUCCH}$ at a subframe i of the UE can be determined by Equation 2 below.

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [dBm] \quad \text{[Equation 2]}$$

In Equation 2 above, $P_{CMAX,c}(i)$ denotes maximum transmit power assigned to the UE at the subframe i of the serving cell c, and is determined by the UE on the basis of a parameter received from the BS or a UE-specific parameter. $\Delta_{F\_PUCCH}(F)$ is provided by a higher layer, and a value of $\Delta_{F\_PUCCH}(F)$ corresponds to a PUCCH format F. $\Delta_{TxD}(F')$ denotes a value given by a higher layer when the UE is configured by the higher layer to transmit a PUCCH at two antenna ports.

$P_{O\_PUCCH}$ denotes a value given by the higher layer, and g(i) denotes a current PUCCH power control regulation state. $PL_c$ denotes a value regarding a path loss.

$h(n_{CQI}, n_{HARQ}, n_{SR})$ is a value depending on the PUCCH format, where $n_{CQI}$ corresponds to the number of CQI information bits and $n_{SR}$ is either 1 or 0 when SR is set in the subframe i. $n_{HARQ}$ denotes the number of HARQ bits transmitted in the subframe i when one serving sell is assigned to the UE. When multiple serving cells are assigned to the UE, $n_{HARQ}$ is the number of transport blocks received in a subframe (i-$k_m$) or (the number of transport blocks received in the subframe (i-$k_m$)+1 (if an SPS release PDCCH is not received in the subframe (i-$k_m$)). In FDD, $k_m$=4.

With respect to the PUCCH format 3, $h(n_{CQI}, n_{HARQ}, n_{SR})$ is given by Equation 3 below.

$$h(n_{CQI}, n_{HARQ}, n_{SR}) = \frac{n_{HARQ} + n_{SR} - 1}{2} \quad \text{[Equation 3]}$$

Referring to Equation 3 above, when ACK/NACK is transmitted by being jointly coupled to different UCI (e.g., SR), the PUCCH transmit power $P_{PUCCH}$ can be determined by treating the different UCI as if it is ACK/NACK. That is, an information bit of the SR is treated as if it is an information bit of the ACK/NACK.

A method of multiplexing UCI information (i.e., CQI, ACK/NACK, SR) in a carrier aggregation system has been described in the present invention when there is no PUSCH transmission. The UCI multiplexing method can be commonly applied to all UEs in a cell, or can be applied to some UEs having insufficient uplink transmit power. In addition, the aforementioned methods may be configurable according to a choice of the BS.

Figure 22:
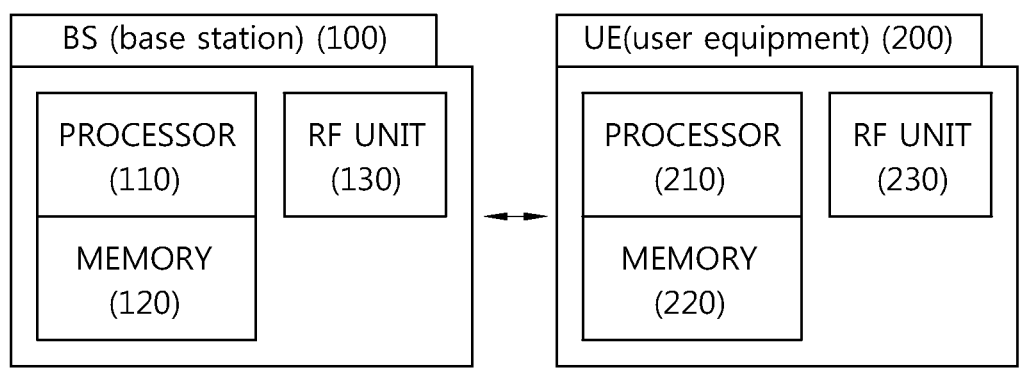
FIG. 22 is a block diagram showing a BS and a UE according to an embodiment of the present invention.

FIG. 22 is a block diagram showing a BS and a UE according to an embodiment of the present invention.

A BS 100 includes a processor 110, a memory 120, and a radio frequency (RF) unit 130. The processor 110 implements the proposed functions, procedures, and/or methods. Layers of a radio interface protocol can be implemented by the processor 110. The memory 120 coupled to the processor 110 stores a variety of information for driving the processor 110. The RF unit 130 coupled to the processor 110 transmits and/or receives a radio signal.

A UE 200 includes a processor 210, a memory 220, and an RF unit 230. The processor 210 implements the proposed functions, procedures, and/or methods. Layers of a radio interface protocol can be implemented by the processor 210. The processor 210 performs channel coding on information bits of UCI to generate encoding information bits, modulates the generated encoding information bits to generate complex-valued modulation symbols, and performs block-wise spreading on the complex-valued modulation symbols to multiple SC-FDMA symbols on the basis of an orthogonal sequence. In addition, the processor 210 determines transmit power for a physical uplink control channel that transmits the complex-valued modulation symbols to the BS 100 on the basis of an information bit of first UCI and an information bit of second UCI included in the information bits of the UCI. The memory 220 coupled to the processor 210 stores a variety of information for driving the processor 210. The RF unit 230 coupled to the processor 210 transmits and/or receives a radio signal. Further, the RF unit 230 transmits the spread complex-valued modulation symbols to the BS.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include baseband circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 120. The memories 120 and 220 may be located inside or outside the processors 110 and 210, and may be coupled to the processors 110 and 210 by using various well-known means. Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

Various modifications may be made in the aforementioned embodiments. Although all possible combinations of the various modifications of the embodiments cannot be described, those ordinary skilled in that art will understand possibility of other combinations. For example, those ordinary skilled in the art will be able to implement the invention by combining respective structures described in the aforementioned embodiments. Therefore, the present invention is not intended to be limited to the embodiments shown herein but is to be accorded the widest scope consistent with the principles and novel features disclosed herein.

What is claimed is:

1. A method for transmitting control information, performed by a user equipment (UE), in a wireless communication system, the method comprising:
    generating, by the UE, uplink control information (UCI); and
    transmitting, by the UE to a base station, the UCI through a physical uplink control channel (PUCCH) in a subframe,
    wherein, when the subframe is configured for transmission of a scheduling request (SR) and when transmission of a hybrid automatic repeat request acknowledgement (HARQ-ACK) coincides with the subframe, transmission power of the PUCCH is determined based on a payload size of both the HARQ-ACK and the SR, and
    wherein a payload size of the SR is one bit.

2. The method of claim 1, wherein the UCI comprises HARQ-ACK information bits and an SR bit.

3. The method of claim 1, wherein the UCI is generated by block-wise spreading of a symbol sequence with orthogonal sequences, and
    wherein the symbol sequence is generated from encoded information bits and the encoded information bits are generated by performing channel coding on information bits.

4. The method of claim 3, wherein the information bits comprise a concatenation of HARQ-ACK information bits for each of a plurality of serving cells and an SR bit, and
    wherein the SR bit is appended to the end of the concatenated HARQ-ACK information bits.

5. The method of claim 1, wherein the payload size of the HARQ-ACK and the SR is determined based on a number of HARQ-ACK information bits and an SR bit.

6. The method of claim 5, wherein a value of the SR bit is determined based on whether or not the subframe is configured for the SR.

7. An apparatus for transmitting control information, the apparatus comprising:
    a radio frequency (RF) unit configured to transmit and receive a radio signal; and
    a processor operably coupled to the RF unit,
    wherein the processor is configured to:
        generate uplink control information (UCI); and
        transmit the UCI to a base station through a physical uplink control channel (PUCCH) in a subframe,
    wherein, when the subframe is configured for transmission of a scheduling request (SR) and when transmission of a hybrid automatic repeat request acknowledgement (HARQ-ACK) coincides with the subframe, transmission power of the PUCCH is determined based on a payload size of both the HARQ-ACK and the SR, and
    wherein a payload size of the SR is one bit.

8. The apparatus of claim 7, wherein the UCI comprises HARQ-ACK information bits and an SR bit.

9. The apparatus of claim 7, wherein the UCI is generated by block-wise spreading of a symbol sequence with orthogonal sequences, and
    wherein the symbol sequence is generated from encoded information bits and the encoded information bits are generated by performing channel coding on information bits.

10. The apparatus of claim 9, wherein the information bits comprise a concatenation of HARQ-ACK information bits for each of a plurality of serving cells and an SR bit, and
    wherein the SR bit is appended to the end of the concatenated HARQ-ACK information bits.

11. The apparatus of claim 7, wherein the payload size of the HARQ-ACK and the SR is determined based on a number of HARQ-ACK information bits and an SR bit.

12. The apparatus of claim 11, wherein a value of the SR bit is determined based on whether or not the subframe is configured for the SR.

* * * * *